US008320842B2

(12) United States Patent
Rousu et al.

(10) Patent No.: US 8,320,842 B2
(45) Date of Patent: Nov. 27, 2012

(54) APPARATUS METHOD AND COMPUTER PROGRAM FOR RADIO-FREQUENCY PATH SELECTION AND TUNING

(75) Inventors: Seppo O. Rousu, Oulu (FI); Marko E. Leinonen, Haukipudas (FI); Juha P. Valtanen, Oulu (FI)

(73) Assignee: Nokia Corporation, Espoo (FI)

( * ) Notice: Subject to any disclaimer, the term of this patent is extended or adjusted under 35 U.S.C. 154(b) by 1219 days.

(21) Appl. No.: 12/154,098

(22) Filed: May 19, 2008

(65) Prior Publication Data
US 2009/0285135 A1 Nov. 19, 2009

(51) Int. Cl.
*H04B 1/44* (2006.01)
(52) U.S. Cl. .............................. 455/78; 455/83
(58) Field of Classification Search ............... 455/63.1, 455/63.3, 73, 78, 80, 81, 82, 83, 550.1, 552.1, 455/553.1
See application file for complete search history.

(56) References Cited

U.S. PATENT DOCUMENTS

| 6,091,966 | A  | * | 7/2000 | Meadows | 455/553.1 |
| 6,445,262 | B1 | * | 9/2002 | Tanaka et al. | 455/552.1 |
| 6,683,513 | B2 |   | 1/2004 | Shamsaifar et al. | 333/135 |
| 6,816,711 | B2 | * | 11/2004 | Standke et al. | 455/73 |
| 6,912,406 | B2 |   | 6/2005 | Lahlum et al. | 455/553.1 |
| 7,020,186 | B2 |   | 3/2006 | McReynolds et al. | 375/219 |
| 7,773,956 | B2 |   | 8/2010 | Fukamachi et al. | 455/78 |
| 2002/0053954 | A1 |   | 5/2002 | Shamsaifar et al. | 333/135 |
| 2003/0022631 | A1 |   | 1/2003 | Rhodes et al. | 455/78 |
| 2009/0285135 | A1 |   | 11/2009 | Rousu et al. | 370/297 |
| 2009/0286569 | A1 |   | 11/2009 | Rousu et al. | 455/553.1 |

FOREIGN PATENT DOCUMENTS

EP  1 311 063 A2  5/2003

OTHER PUBLICATIONS

"A Tunable Saw Duplexer", David Penumuri, et al., IEEE Ultrasonics Symposium 2000, pp. 361-366.
"Tunable Duplexer Having Multilayer Structure Using LTCC", Kouki Saitou et al., IEEE MTT-S Digest, 2003, pp. 1763-1766.
"Tunable Filter Devices", WiSpry Digital Duplexer, 2007, 1 pg.

* cited by examiner

*Primary Examiner* — Thanh Le
(74) *Attorney, Agent, or Firm* — Harrington & Smith

(57) ABSTRACT

An apparatus includes a tunable diplexer; first, second and third radio nodes; and path selection circuitry. The tunable diplexer includes a dedicated port, at least a first signal port and a second signal port, and control inputs configured to change at least one of frequency characteristics and phase characteristics of the tunable diplexer. The path selection circuitry is configurable to select between a first signal pathway between the third radio node and the first signal port and a second signal pathway between the third radio node and the second signal port. The tunable diplexer may have control signals inputs to select between the first and second signal pathways based on an expected interference scenario between radio signals at the first and second signal ports, and the control signals may change frequency characteristics and/or phase characteristics of at least one of the signal ports based on an operational condition of the apparatus.

25 Claims, 17 Drawing Sheets

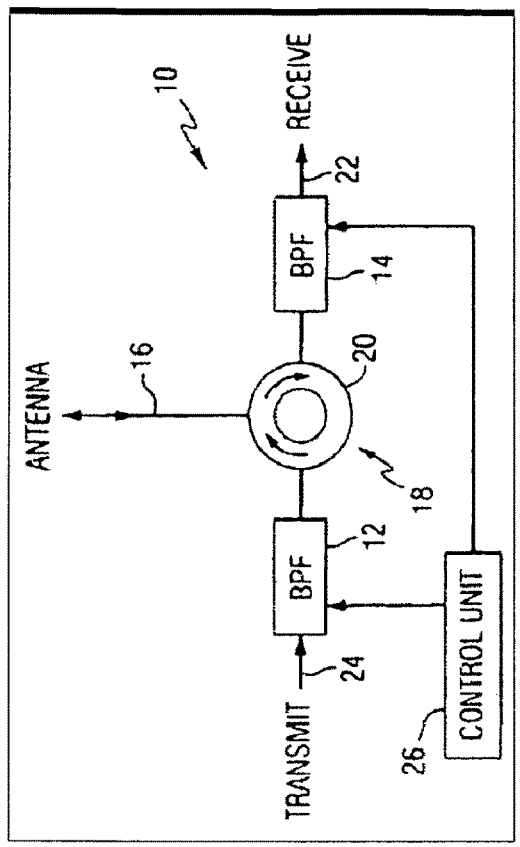
Figure 1b: Prior Art
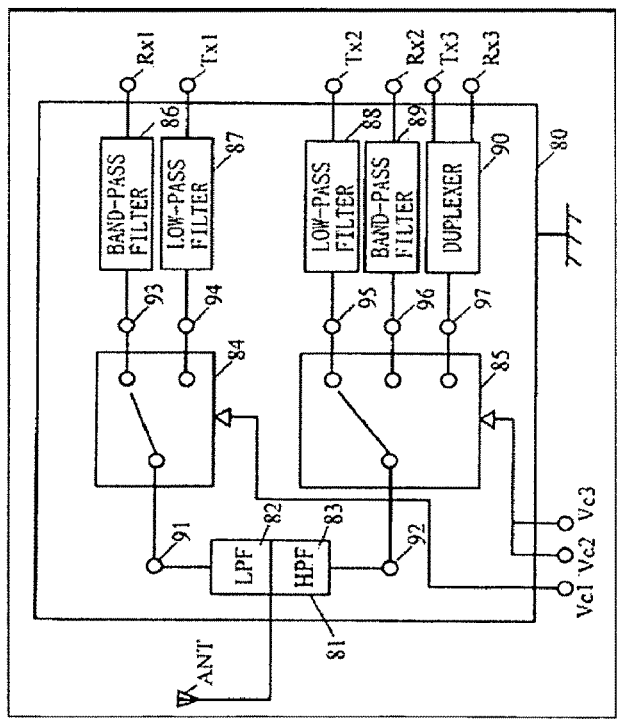
Figure 1a: Prior Art

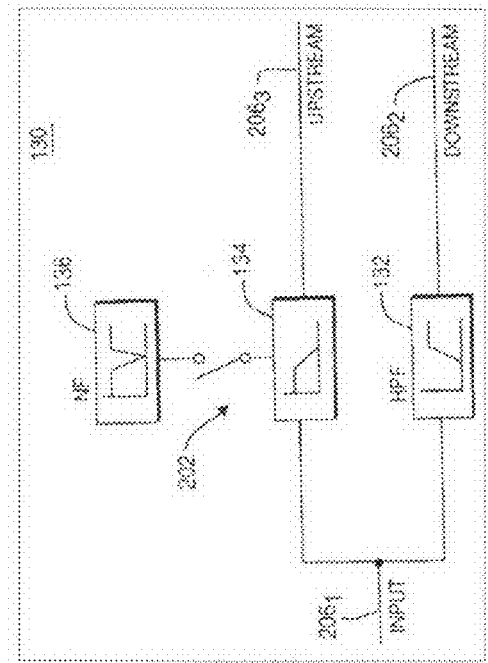
Figure 1c: Prior Art
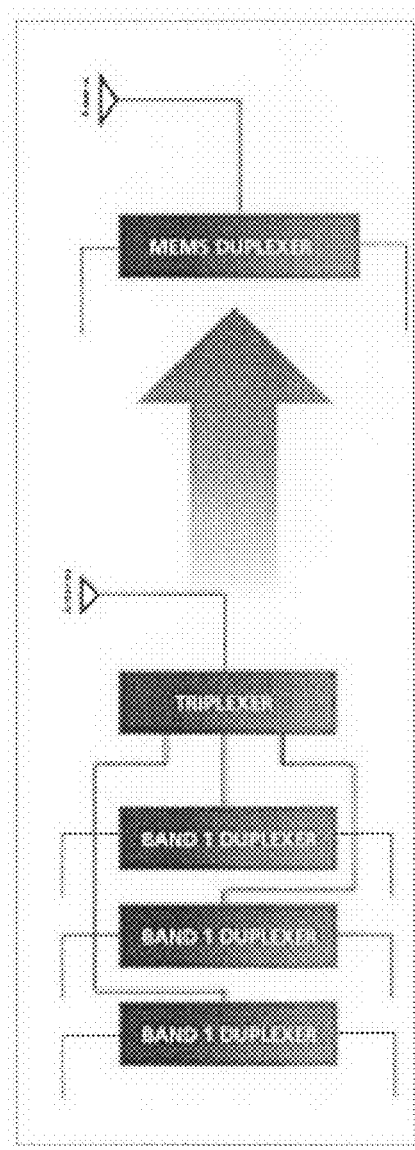
Figure 1d: Prior Art

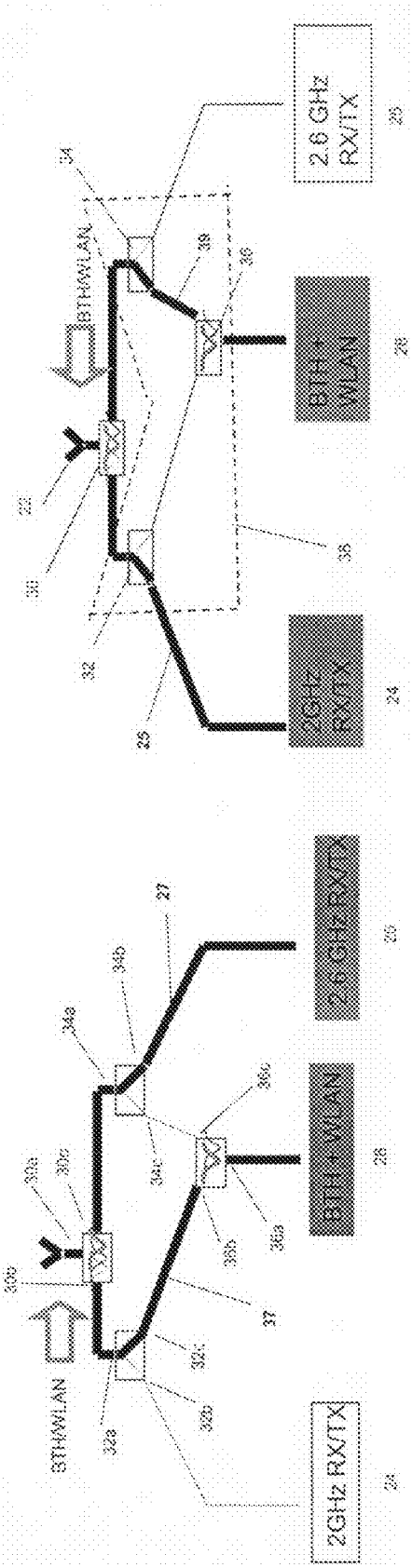

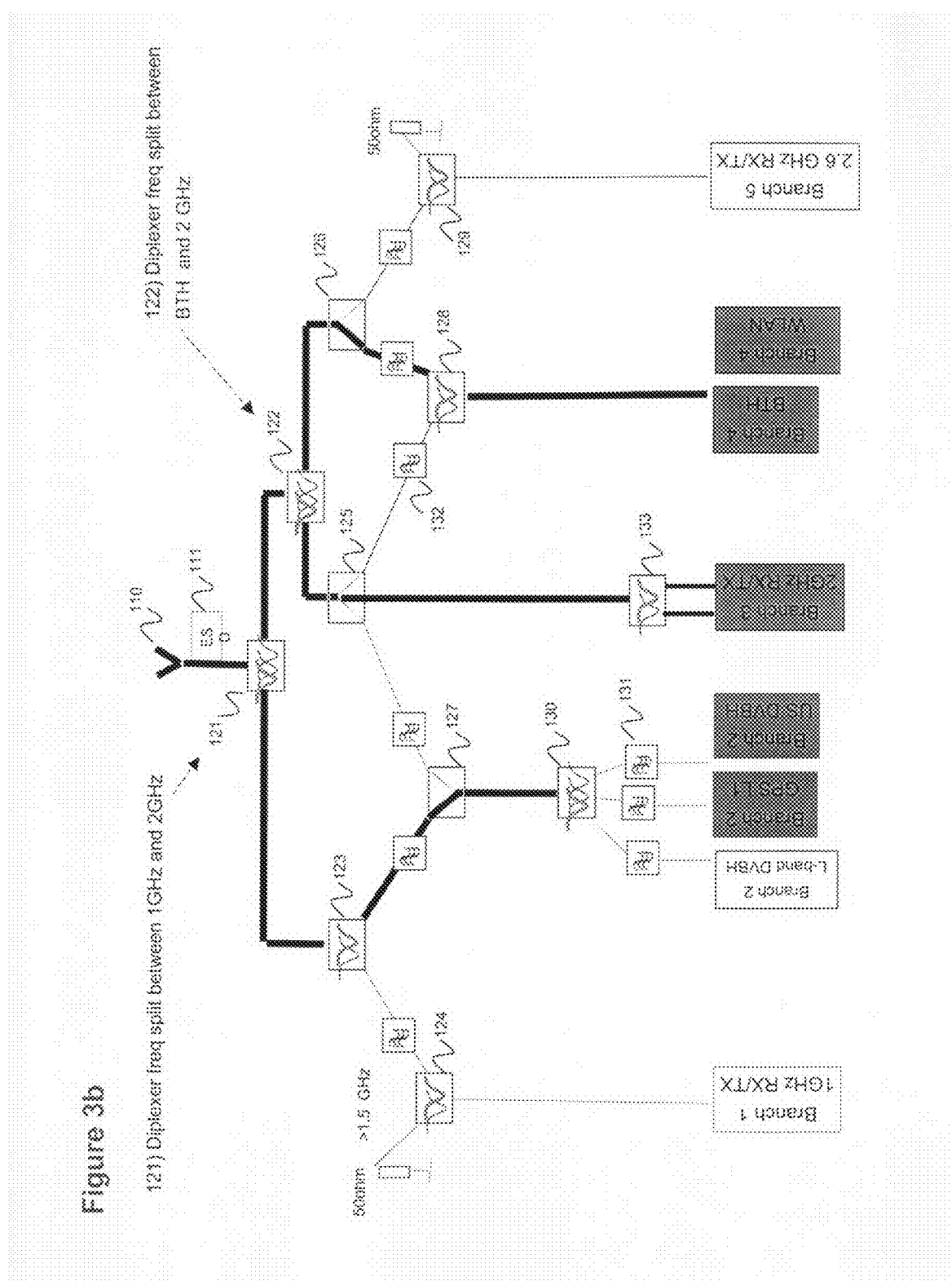

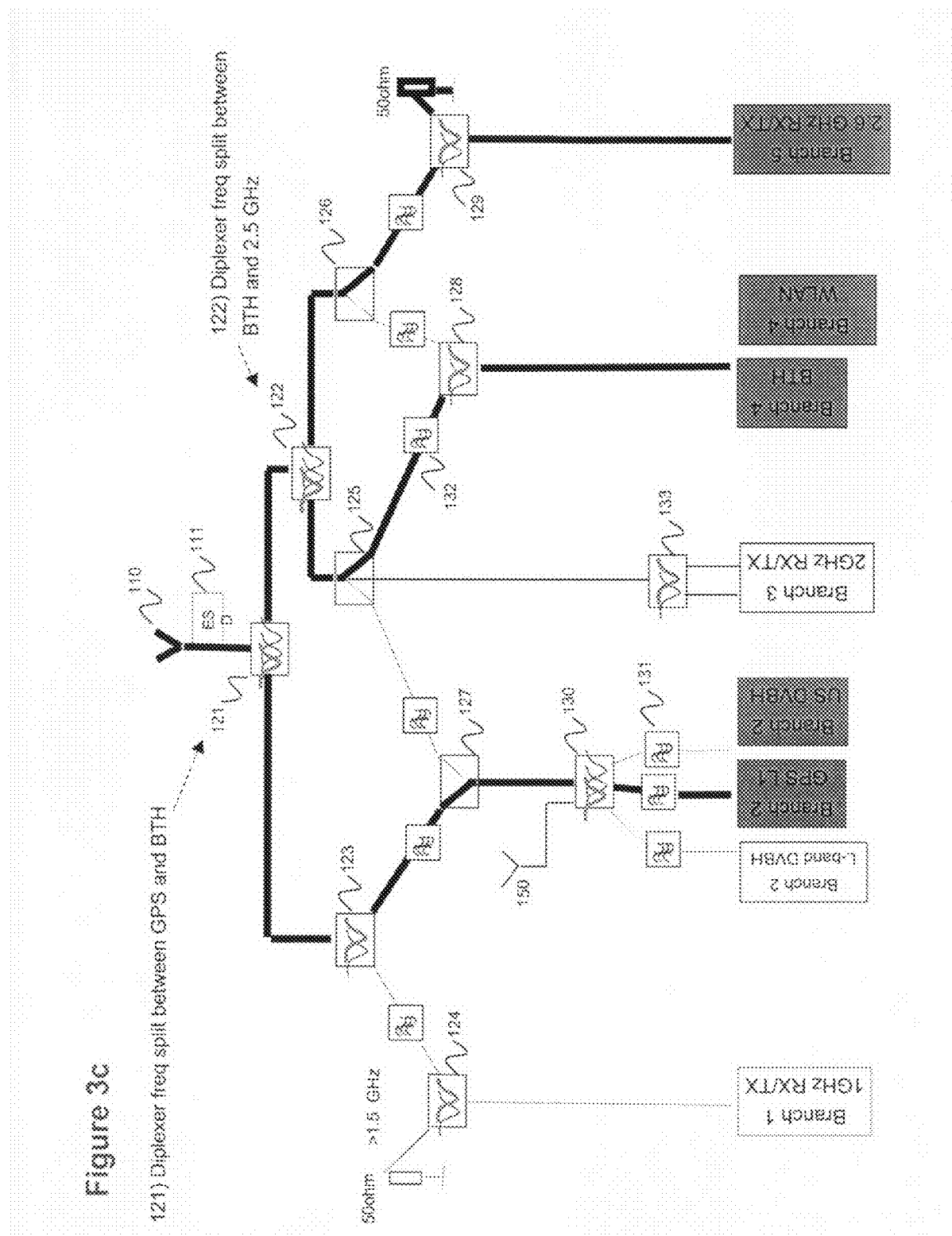

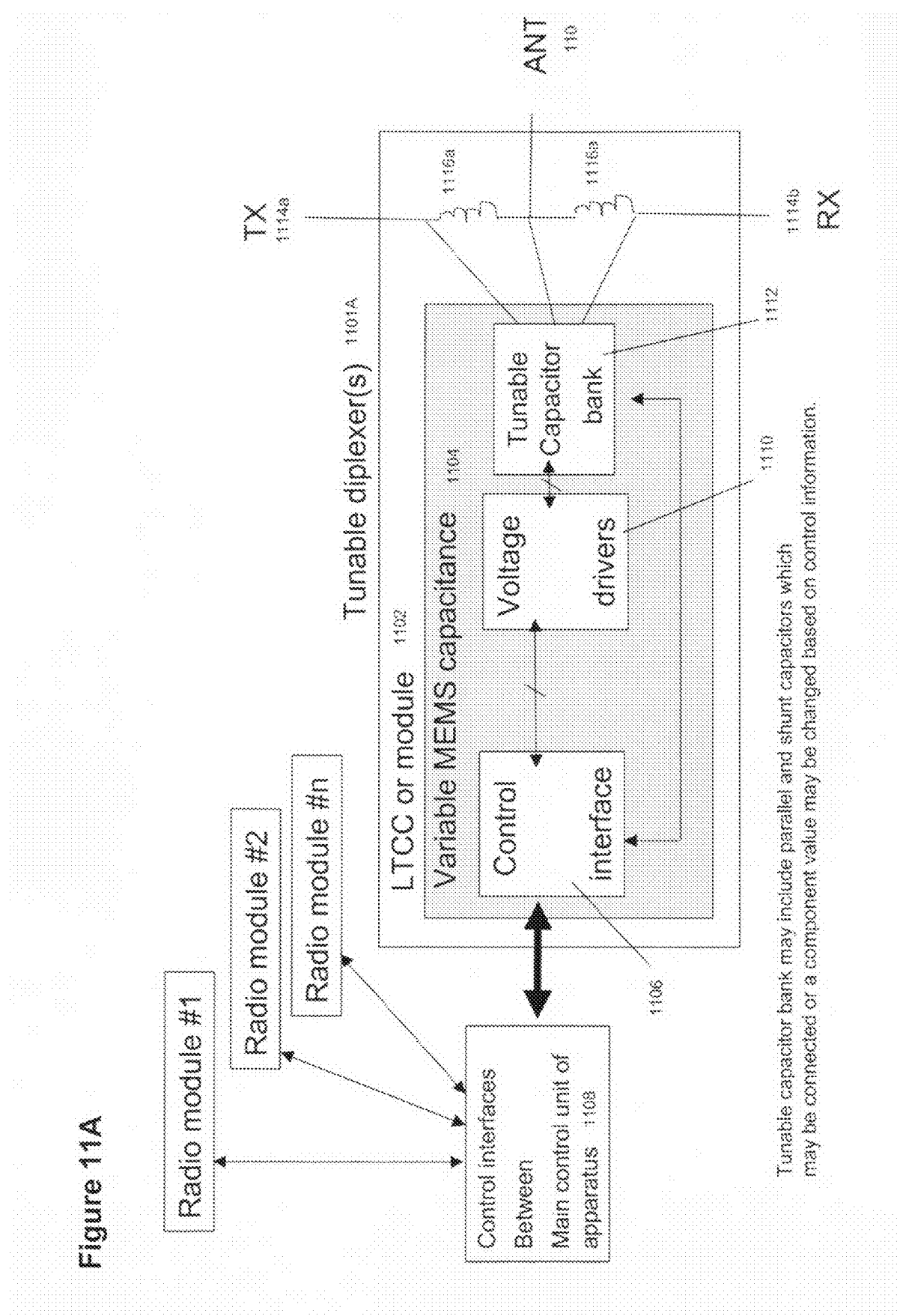

US 8,320,842 B2

APPARATUS METHOD AND COMPUTER PROGRAM FOR RADIO-FREQUENCY PATH SELECTION AND TUNING

CROSS REFERENCE TO RELATED APPLICATIONS

This application is related to co-owned U.S. patent application Ser. No. 12/154,099 filed under express mailing label no. EM026579370US and entitled "Apparatus, Method and Computer Program for Configurable Radio-Frequency Front End Filtering"; and also to co-owned U.S. patent application Ser. No. 12/154,100 filed under express mailing label no. EM02657983US and entitled: "Apparatus, Method and Computer Program for Interference Reduction", both of which are filed this same day and both of which are herein incorporated by reference in their entirety.

TECHNICAL FIELD

The teachings herein relate generally to wireless multiradio devices including components and antennas thereof that are configured to transmit and/or receive using different radios and frequencies, and particularly relates to interoperability between these different radios and an architecture by which the related components are arranged in the device.

BACKGROUND

Following are some acronyms used in the text below and in certain of the figures:
   DVB-H digital video broadcasting—handheld
   E-UTRAN evolved UTRAN (also known as 3.9 G or long term evolution LTE)
   GPS global positioning system (e.g., Glonass, Galileo)
   GSM global system for mobile communications
   ISM industrial, science, medical
   UTRAN universal mobile telecommunications system terrestrial radio access network
   LTE long term evolution
   WCDMA wideband code division multiple access
   WLAN wireless local area network
   WiMAX worldwide interoperability for microwave access Use of and research into what is termed multiradio devices is a growing trend in wireless communications. They enable the user to take advantage of increased network coverage at hotspots covered by another radio technology, they enable users to access wide area networks (e.g., traditional cellular) and more localized networks (e.g., Bluetooth with a headset or a personal computer PC) either separately or simultaneously, and in some instances enable the wireless device to act as a mobile router for other traffic. A multiradio device user can then optimize costs by, for example, handing over to a radio technology network in which the user pays a flat rate or reduced rate as compared to other available networks, or use a free/low cost network (e.g., WLAN) to which s/he has access for more voluminous data downloads as opposed to another network that charges on a volume basis for data. Different networks may price differently for voice, data and/or broadcast, and the multiradio device can take advantage of cost arbitrage across these different networks and signal types.

These advantages are not without technical challenges. Device manufacturers as well as network operators must assure that quality of service QoS is preserved across the various networks they support, and particularly for portable multiradio device manufacturers power consumption becomes again a major concern. Coexistence of the different transceivers must fulfill certain system-specific requirements in order to maintain a high QoS, such as, harmonics, noise attenuation and blocking. Generally these are accomplished via various filters in the transmitters and receivers of these radios.

One aspect of the necessary isolation between the various radios of a multiradio device is isolation between antennas, termed in the art as minimum coupling loss MCL. For example MCL can be set to any fixed value and filtering requirements are based on that assumption. The specific filtering implemented in a particular device depends on front end band combinations and the antenna systems being used, whether single feed, dual feed, multi feed, or separate transmit and receive antennas to name a few common antenna systems. Filtering also depends on whether different cellular and complementary radios of the device use the same antenna, the frequencies in use at the same antenna, and case (housing size) requirements for multiradios.

The size of the multiradio device is limited by technical design factors. External or whip type antennas are giving way to internal antennas (e.g., planar inverted F-antenna PIFA for example) and even in the case of whip monopole antennas there is commonly a retractability feature that poses a design consideration for putting together all necessary components in a small device. Antennas occupy precious volume within the device housing and they need to have a certain placement in the device, both relative to other internal components and to how a user would hold the device (if the multiradio is handheld as many are) to either avoid or exploit coupling with the user's body. This concern for placement is to achieve an acceptable total radiated power/total radiated sensitivity TRP/TRS, which are metrics in the wireless arts for antenna performance. The various antennas for the various radios of a multiradio device need to be combined together to fit into the device housing. How they may be combined or disposed relative to one another is limited by the MCL requirements and what is a feasible bandwidth of an individual antenna at a certain antenna size. If the number of the needed antennas can be reduced, then the remaining antennas can be bigger in volume and thus the radiating efficiency of the single antenna (or the fewer antennas) can be improved.

If the radio frequency RF air-interface is generating interferences to the wireless terminal receivers, then transceiver communication performance is either degraded or the air-interface connection does not work at all. There are also technical challenges in designing the RF engine within the multiradio device. Typically, verification of a new RF engine design takes months, and requires dedicated frequency-variant verification resources during development of that RF engine. The RF front end, nearest the antenna, has grown to modules of increasingly complexity and cost. This complexity is seen in a greatly increased number of switches, which in the transmitter and receiver generates TRP, TRS and harmonics problems. The number of cellular and complementary antennas is increasing in multiradio devices as more networks are supported, and this trend is expected to continue. For example >2.6 GHz transceiver systems with antennas are anticipated for the near future, to support for example LTE (EUtran), WiMAX and WLAN 5 GHz. Interoperability to meet the required MCL isolations then becomes even more difficult to achieve between antennas. An increased number of antennas increases basic costs and an increasing amount of metallization within the multiradio device further limits placement options for these added antennas.

There are also co-existence interoperability requirements between cellular and complementary transceivers so that different ones of the radios can be used at the same time. For this the following issues need to be solved:

WCDMA LTE band VII (2.6 GHz) transmitter generated noise to ISM (WLAN) band, with current filtering (bulk acoustic wave BAW or surface acoustic wave SAW) technology GSM/WCDMA/CDMA transmitter harmonics, a wide band noise and an adjacent and an alternative channel power leakage overlaps multiple terrestrial and mobile television channels and channel allocations, GPS band and ISM band allocations at 2.4 GHz and 5 GHz frequency ranges.

Cellular harmonics falling to 2.4 GHz and 5 GHz WLAN and WiMAX 3.4 GHz systems

WLAN, Bluetooth, WiMAX and 3.9 G operate all at 2.3-2.7 GHz band:
        a. WLAN at 2400-2497 MHz;
        b. Bluetooth at 2400-2484 MHz
        c. WiMAX at 2300-2400, 2490-2690, and 3400-3800 MHz;
        d. LTE (3.9 G) at 2500-2690 MHz.

One prior art approach to addressing the RF front end in a multiradio device is seen at European Patent Application EP 1311063 A1. FIG. 10 of that reference is reproduced at FIG. 1a of this paper, and is seen to use a diplexer 81 to couple an antenna ANT to a duplexer 90 via a high frequency switch circuit 85. Another approach is seen at U.S. Pat. No. 6,683,513, of which FIG. 1 of that reference is reproduced as FIG. 1b herein. This approach uses an electronically tunable RF diplexer 10 tuned by tunable capacitors in filters 12, 14. Yet another prior art approach is seen at US Patent Publication No. US2003/0022631 A1 (of which FIG. 2 of that reference is reproduced herein as FIG. 1c) that describes a multi-mode bidirectional communications device including a diplexer 130 having a switchable notch filter 134. And finally, shown as FIG. 1d herein is a diagram of a tunable filter device which was taken from an advertisement by the WiSpry Company of Irvine, Calif., USA. Other documents give various details for the tunable duplexers cited in those references (see for example "A TUNABLE SAW DUPLEXER" by David Pennunuri, Richard Kommrusch and Neal Mellen, 2000 IEEE Ultrasonics Symposium, pp 361-366; and "TUNABLE DUPLEXER HAVING MULTILAYER STRUCTURE USING LTCC" by Kouki Saitou and Keisuke Kageyama, 2003 IEEE MTT-S Digest, pp 1763-1766).

What is needed in the art is an improved architecture for a multiradio device to overcome some of the design challenges incorporating ever more radios in a multiradio device and interfacing them to antennas while meeting the technical performance requirements, without expanding the housing size of a handheld wireless multiradio device.

SUMMARY

In accordance with one exemplary embodiment of the invention is an apparatus that includes a tunable diplexer; first, second and third radio nodes; and path selection circuitry. The tunable diplexer includes a dedicated port, at least a first signal port and a second signal port, and control inputs configured to change at least one of frequency characteristics and phase characteristics of the tunable diplexer. The path selection circuitry is configurable to select between a first signal pathway between the third radio node and the first signal port and a second signal pathway between the third radio node and the second signal port.

In accordance with another exemplary embodiment of the invention is a method that includes determining an expected interference scenario between radios of a multiradio device; and based on the expected interference scenario, sending a control signal that changes at least one of frequency characteristics and phase characteristics of a tunable diplexer so as to couple a third radio of the radios to a first signal port of the tunable diplexer via a first signal pathway or to a second signal port of the tunable diplexer via a second signal pathway.

In accordance with another exemplary embodiment of the invention is a computer readable medium that stores a program of computer instructions that when executed by a digital processor result in actions directed to selecting a signal pathway for radios of a multiradio device. In this embodiment the actions include determining an expected interference scenario between radios of a multiradio device; and based on the expected interference scenario, sending a control signal that changes at least one of frequency characteristics and phase characteristics of a tunable diplexer so as to couple a third radio of the radios to a first signal port of the tunable diplexer via a first signal pathway or to a second signal port of the tunable diplexer via a second signal pathway.

In accordance with another exemplary embodiment of the invention is a device that includes adjustable switching means (e.g., a tunable diplexer) for changing at least one of frequency characteristics and phase characteristics of the adjustable switching means. The adjustable switching means includes at least a dedicated port and a first signal port and a second signal port and control input means. The device further has a first radio node, a second radio node and a third radio node; and also path selection means (e.g., circuitry) for selectively activating a first signal pathway between the third radio node and the first signal port and a second signal pathway between the third radio node and the second signal port.

BRIEF DESCRIPTION OF THE DRAWINGS

FIGS. 1a-d are prior art illustrations of multiradio architecture.

FIGS. 2a-2c are schematic diagrams of a radio front end in two different configurations by which a different pair of the three radios of the multiradio device are simultaneously coupled to the antenna according to a simple embodiment of the invention.

FIGS. 3a-3c are similar to FIGS. 2a-2b but showing an implementation wherein the multiradio device has five or more radios, of which there are alternate paths between the single antenna and each of at least two of those radios.

FIGS. 11A-C are block diagrams illustrating three exemplary implementations of a tunable diplexer for use in embodiments of the path selection circuitry according to these teachings.

DETAILED DESCRIPTION

Figure 2C:
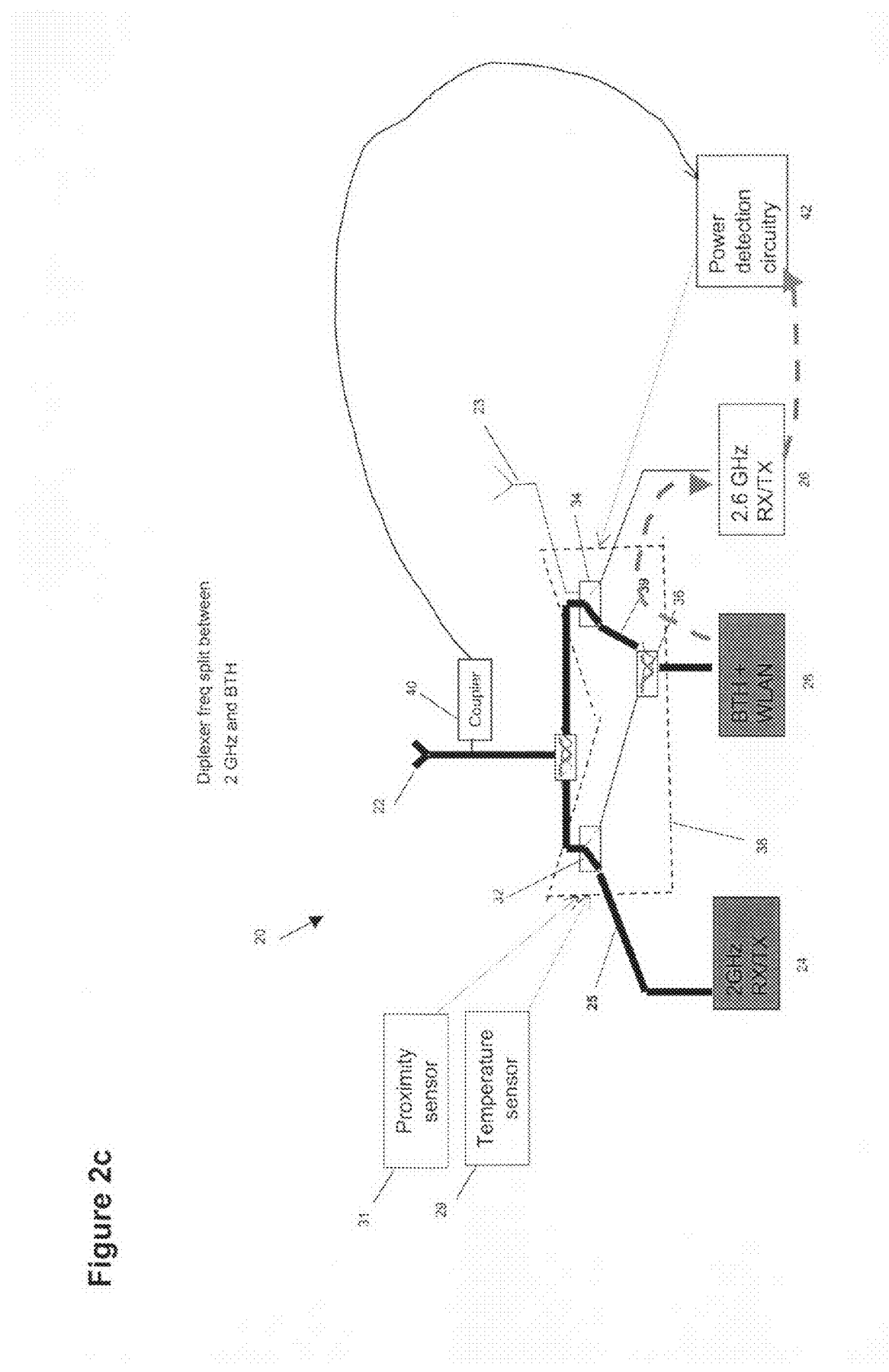

A basic embodiment of the invention is shown at FIGS. 2a-2c, where reference numbers across FIGS. 2a-2c are common to them both with the exception of the active signal paths/branches 37 and 39. Note that there is a single antenna 22 to which three radios of the multiradio device 20 (shown only as circuitry in FIGS. 2a-2c) are selectively coupled. This is not to imply that a multiradio device embodying this invention has only one antenna; indeed it may have multiple antennas to exploit diversity transmitting and receiving. But embodiments of this antenna selectively couple different combinations of radios to a single antenna, and so may be present in one instance in a device or in multiple instances in a device (e.g., each of two or more antennas of a single device are selectively coupled to different radio combinations according to these teachings). Alternatively individual antennas can be assigned to the radios. The particularized description generally details exemplary embodiments of the invention in the context of transmit pathways in which the radios are transmitters, but these teachings also extend to the companion receive pathways in which the radios are receivers (alternatively or in combination). The term radio/branch as used herein therefore includes transmitters, receivers, and transceivers.

The three radios in FIGS. 2a-2b are by example one cellular radio 24 operating at a center frequency of 2 GHz or thereabouts [e.g., high band GSM (1800/1900), certain WCDMA frequencies] and termed generally a first radio 24; a different cellular radio 26 operating at a center frequency of 2.6 GHz or thereabouts (e.g., certain E-UTRAN or certain WCDMA frequencies) and termed generally a second radio 26; and a third radio 28 shown by example as a Bluetooth BT or WLAN radio and operating at a center frequency of about 2.4 GHz.

Also in FIGS. 2a-2b is a tunable antenna diplexer 30, two switches 32, 34 and a second tunable diplexer 36 termed here a path-switching tunable diplexer 36, can be also switch. Diplexers are also termed diplex filters or duplexers, and as used herein include more robust variations such as triplexers, which has three signals ports and the like. The tunable antenna diplexer 30 has an output port 30a (also termed a dedicated port) adapted to couple to the antenna 22, a first signal port 30b and a second signal port 30c. The term dedicated port is simply to avoid the implication that it operates only in the transmit direction. A first switch 32 has a node 32a coupled to the first signal feed 30b of the tunable diplexer filter 30, a first pole 32b (also termed a first radio pole) 32b coupled to the first radio 24, and a second pole 32c. A second switch 34 has a node 34a coupled to the second signal port 30c of the tunable diplexer filter 30, a first pole (also termed a second radio port) 34b coupled to the second radio 26, and a second pole 34c. The path-switching tunable diplexer 36 has a radio port 36a, a first signal port 36b coupled to the second pole 32c of the first switch 32 and a second signal port 36c coupled to the second pole 34c of the second switch 34. FIGS. 2a-2b illustrate the first 32 and second 34 switches as simple switches, but as will be seen in other embodiments these also may be tunable diplexers. Additionally, in an embodiment the path-switching tunable diplexer 36 may be a simple switch. Alternative embodiment to implement a switch 32 or 34 is to use adjustable Wilkinson divider. An adjustable divider or combiner may be implemented with an adjustable Wilkinson power divider for it is able to adjust transmission or reception power between paths. Wilkinson divider is an N-port network used for power splitting and combining. A power division or a combination ratio of the adjustable Wilkinson divider can be adjusted by control signal.

The diplex filters described herein are understood as being tunable in that the frequency bands which are passed (and other bands which are blocked) at a particular input or output port are adaptable by means of control signals sent to the diplex filter. As will be seen, a particular multiradio device will have a certain number of radios, and there will be control signals stored in a local memory which are used to dynamically adapt the cutoff frequency of the different ports of the tunable diplex filters described herein based on which particular radios are in use at a given time, which is termed the use-case for the multiradio apparatus. Adaptively changing the cutoff frequency of the different diplex filter ports with control signals based on the use-case enables those control signals to select different active pathways between the antenna and the various radios that are currently in use, and the transmit/receive signals pass along those selected pathways.

Consider the two switches 32, 34 in combination with the path-switching tunable diplexer 36 as path selection circuitry 38. Active signal pathways are shown as bolded lines at FIGS. 2a-2c. In FIG. 2a, the path selection circuitry 38 is configured so that both the second radio 26 and the third radio 28 are coupled through the tunable antenna diplexer 30 to the antenna 22. For the example radios given, that means a 2.6 GHz signal follows a second radio branch or pathway 27 between the second radio 26 and the second signal port 30c of the tunable antenna diplexer 30; and a 2.4 GHz signal follows a third-radio first branch or pathway 37 between the third radio 28 and the first signal port 30b of the tunable antenna diplexer 30. No signal pathway actively couples a signal from the first radio 24 to the antenna; the first pole 32b of the first switch 32 is in a non active state. The non active state may be either an open-circuit or a short-circuit state, depending on the radio implementation which is connected to the first switch 32. These conditions can be called as a high impedance or a low impedance modes, respectively. These modes effectively block the signal leakage to the non active port of the switch 32. Call this arrangement of the path selection circuitry at FIG. 2a a first configuration, and the path-switching tunable diplexer 36 acts as a low pass filter between its radio port 36a and its first signal port 36b. The high-band elements of the 2.4 GHz-centered signal input from the third radio 28 are blocked and only the lower-band elements pass, and follow the third-radio first branch 37 which goes between the path-switching tunable diplexer 36 to the first signal port 30b of the antenna diplexer 30. Tuning of the path-switching tunable diplexer 36 selects this path 37 by RF filtering over the alternative path 39 seen at FIG. 2b. The second switch 34 couples the second radio 26 to the second signal port 30c of the antenna diplexer 30 through its first pole 34b and so the 2.6 GHz-centered signal from that radio 26 follows its own second-radio branch 27 to the antenna diplexer 30.

At FIG. 2a, the tunable antenna diplexer 30 operates on the (2.4 GHz) signal input to the first signal port 30b as a low pass filter, clipping any higher frequency artifacts not already clipped by the path-switching tunable diplexer 36. Note that the filtering function of the antenna tunable diplexer 30 will be more pronounced when the path-switching element 36 is a tunable diplexer as opposed to a simple switch, but even if no actual portion of the signal input to the first signal port 30b is clipped, that port 30b operates as a low pass filter if it is configured/tuned as such. Still within the first configuration of FIG. 2a, the second signal port 30c of the antenna diplexer 30 operates on the (2.6 GHz) signal input to the first signal port 30b as a high pass filter, clipping any lower frequency segments of the signal originating from the second radio 26. Similar to the path-switching element 36, the second switch 34 may be a tunable diplexer also, in which case that element 34 would do the majority of signal filtering from the second radio 26 and the tunable antenna diplexer 30 would serve on the signal input to the second signal port 30c as a backup or check function for the same clipping/filtering.

Now at FIG. 2b is shown a second configuration of the path selection circuitry, where the path selection circuitry 38 is arranged so that both the first radio 24 and the third radio 28 are coupled through the tunable antenna diplexer 30 to the antenna 22, and the second pole 34b of the second switch 34 is in a non active state. The non active state may be either an open-circuit or a short-circuit stage, dependent on the radio implementation which is connected to the second switch 34. These conditions can be called as high impedance or low impedance modes, respectively. These modes effectively block the signal leakage to non active port of the component. A non active state is facing the second radio 24 so in FIG. 2b no signal gets to the antenna 22 or to radio 24 along the path 37 that was active in FIG. 2a. For the example radios given, that means a 2 GHz signal follows a first radio branch or pathway 25 between the first radio 24 and the first signal port 30b of the tunable antenna diplexer 30; and a 2.4 GHz signal follows a third-radio second branch or pathway 39 between the third radio 28 and the second signal port 30c of the tunable antenna diplexer 30. In this second configuration, the path-switching tunable diplexer 36 acts as a high pass filter between its radio port 36a and its second signal port 36c. The low-band elements of the 2.4 GHz-centered signal from the third radio 28 are blocked and only the higher-band elements pass, along the third-radio second branch 39 between the path-switching diplexer 36 to the second signal port 30c of the antenna diplexer. Tuning of the path-switching diplexer 36 also selects this path 39 by RF filtering. The first switch 32 couples the first radio 24 to the first signal port 30b of the antenna diplexer 30 through its first pole 32b and so the 2 GHz-centered signal from that radio 24 follows its own first-radio branch 25 to the antenna diplexer 30.

An alternate embodiment can operate all three radios 24, 26 and 28 at the same time. Assuming the second configuration of FIG. 2b and the example frequencies above, the first radio 24 is coupled to the low-pass side 30b of the antenna diplexer 30, but the second switch 34 is implemented as a diplexer that operates to pass both the 2.4 GHz Bluetooth/WLAN signal from the third radio 28 and the 2.6 GHz signal from the second radio 26, and the high pass port 30c of the antenna diplexer 30 is set to pass frequencies above 2.0 GHz. Similarly, the first configuration can be set by the control signals so that both the Bluetooth/WLAN signals and the low-band cellular signals (2.0 GHZ) to/from the first radio 24 can be passed simultaneously through the low pass port 30b of the antenna diplexer 30, using another diplexer to implement the switch 32 so that both signals can pass simultaneously.

The tunable diplexer frequency characteristics can be tuned based on the control signal. The control for the frequency characteristics can be done according the signal path selection, the use-case mentioned above. In the port filtering mode, which can be in a high pass or a low pass mode, then the cut off frequency can be tuned. The cut off frequency of any unused port can be tuned so that the unused port impedance condition is in high impedance or in low impedance mode. This improves an isolation between the input/tunable ports and the output port and thus the power leakage to the unused port can be minimized. If the unused port is connected to an active radio then improved isolation between ports improves the interference situation of the multiple radios. This enables multiple radios to operate at the same time even if the radios are coupled to the commonly used components (e.g., the diplexers, switches and antenna).

As with FIG. 2a, the second configuration of FIG. 2b finds the tunable antenna diplexer 30 operating on the signal input to its first signal port 30b as a low pass filter and on the signal input to its second signal port 30c as a high pass filter. In this configuration the antenna diplexer 30 is low-pass filtering the 2 GHz signal and high-pass filtering the 2.4 GHz signal. While the same ports operate consistently as low or high pass filters in FIGS. 2a-2b, the nature of the filtering differs due to the different frequencies being allowed to pass so as to avoid interference. So the frequency-tuning of the tunable antenna diplexer 30, as well that of the path-switching tunable diplexer 36, changes between the first and second configurations to adapt to the center frequency of those radios being simultaneously coupled along an active signal path to the output port. An alternate embodiment is that the tunable antenna diplexer 30 in the first configuration can set port 1 (30b) as the low pass side and port 2 (30c) as the high pass side and in the second configuration set port 1 (30b) to high pass and port 2 (30c) to low pass. That is, there is no restriction on one side or the other always being high or low pass relative to its opposite port, but the specific configuration of FIGS. 2a-b work out that way.

As a further improvement, at FIG. 2a the 2 GHz cellular signal from the first radio 24 may be fed to the low pass input side (the first signal port) 30b of the tunable antenna diplexer 30 to attenuate noise to the third radio receiver 28; and at FIG. 2b the 2.6 GHz cellular signal from the second radio 26 may be fed to high pass input side (the second signal feed) 30c of the tunable antenna diplexer 30 to attenuate noise to that third radio receiver 28.

From the simple implementation of FIGS. 2a-2b it is seen that the invention may be embodied as circuitry such as a plurality of discrete switches or adjustable Wilkinson dividers and one or more tunable diplexers, as an integrated circuit with chip-level devices implementing the functionality described, as a method and as a computer program tangibly embodied on a medium and adapted to control the switches and tunable diplexers as described above. Specifically, a device embodying this aspect of the invention may include a tunable diplexer 30 and path selection circuitry 38. The tunable diplexer 30 has an dedicated port 30a, a first signal feed or port 30b, and a second signal port or feed 30c. The path selection circuitry 38 is switchable between a first configuration (FIG. 2a) that couples a radio port 36a to the first signal port 30b via a first circuit branch 37 through the path selection circuitry and a second configuration (FIG. 2b) that couples the radio port 36a to the second signal port 30c along a second circuit branch 39 through the path selection circuitry. As above, the path selection circuitry 38 may include three switches, a tunable diplexer 36 and two other switches 32, 34 as illustrated at FIGS. 2a-2b, three tunable diplexers, or other combinations of switches and tunable diplexers so as to switch into the (antenna) tunable diplexer 30 the first/second or other radios with the third radio that is switched in via the radio port 36a. An alternative embodiment is that at least one of the switches can be implemented with an adjustable divider or combiner. The (antenna) tunable diplexer 30 is configurable so that the first signal port 30b operates as a low pass filter in the first configuration, and the second signal port 30b operates as a high pass filter in the second configuration. Because the path selection circuit 38 switches the same radio port 36a to the one 30b or the other 30c signal port of the diplexer 30 when the path selection circuit switches, implied is that the tunable diplexer passes the same frequency for that radio port through the one port 30b in one configuration and through the other port 30c in the other configuration. As will be seen, it may be that the cutoff frequency for what is passed through those different ports 30b, 30c may not be exactly the same in every instance of those two different configurations because similar frequency radios may be grouped along the same path selection circuit branch, but the overall concept remains true.

As can be appreciated from this basic implementation, embodiments of the invention enable a multiradio device to use a single feed antenna in different multiradio use cases. FIGS. 2a and 2b illustrate just two different uses cases; many more are possible with more radios, as will be illustrated and described. It is noted that the tunable diplexer is distinct from a fixed frequency diplexer; it is the tunability of the diplexer 36 that enables the frequency and/or phase characteristics of the filtering to be changed. The tunable antenna diplexer 30 can, at the same time of operation, feed one antenna 22 as illustrated with cellular (24) and/or (26) and/or complementary (24) multiradio signals. The antenna 22 can be a main antenna or a diversity antenna, and two iterations of an embodiments of the invention can be employed to feed both main and diversity antennas. Which of the multiradios are in use at a given time gives context for which RF signals are wanted (high-pass or low-pass relative to the center frequency) and those signals are routed along alternate signal paths 37 and 39. The alternate signal paths are combined (in the transmit direction)/divided (in the receive direction) at the antenna diplexer 30, and the route selected through the path-selection circuitry 38 determines the frequency-specific filtering.

Alternate signal paths impose filtering according to the network/system requirements against present interferences for the present multiradio use case (e.g., which subset of the multiradios are in use). A needed filtering to secure concurrent transmission and reception of different systems in multiple multiradio use cases is use case dependent. In some use cases the terminal user may change the antenna resonance of the antenna 22. This antenna resonance characteristics change will change isolation between other operational antennas. This will affect the needed filtering before the transmission and/or reception antenna. In order to maintain total signal attenuation between radios, the used signal path and the filtering of the signal path can be altered. For example, different filters can be imposed along the different paths 37, 39, knowing which other radio 24, 26 will be in use and which will not be in use when either of those paths 37, 39 is operable. These may be implemented as discrete fixed filters (notch, low pass, high pass, band pass) or tunable diplexers or take other forms in different implementations. An alternative embodiment is that in some cases the extra filtering can be bypassed.

There is also the possibility of exploiting the attenuation properties of the path-selecting diplexer 36 to fulfill the filtering requirements of the single feed multiradio antenna 22. For a received signal going to the third radio 28, the signal port 36b, 36c of the path-selecting tunable diplexer 36 is selected by the receive path 37, 39 according to the switches 32, 34 and the signal feed port 30b, 30c of the tunable antenna diplexer 30 through which that received signal passes. That selection is made according to the transmit signal frequency that may be sent on another of the paths 25, 27 toward the antenna 22. In an embodiment, the path-selecting tunable diplexer 36 as well as the tunable antenna diplexer 30 is configured for 3 dB frequency in both high pass and low pass modes according to the current use/subset of multiradios in use at a given time. As will be detailed, a splitter tunable diplexer pass band (PB) is configured according to the wanted signal path.

The antenna feeding system, which includes the path selection circuitry 38 and the antenna diplexer 30, can have sequential (series) and parallel tunable diplexers, the former shown in FIGS. 2a-2b and the latter shown below and also described in text for FIGS. 2a-2b wherein one or both of the switches 32, 34 are tunable diplexers. Any of these diplexers can operate as a forward signal combiner and/or splitter in routing the radio or antenna signal. For example, in the receive mode the antenna diplexer 30 of FIGS. 2a-2b acts as signal splitter and in the transmit mode it acts as a signal combiner. Similarly, in the transmit mode when all three radios 24, 26, 28 are active simultaneously, then either the diplexer implementing the first switch 32 or the second switch 24 will act as a signal combiner also.

One diplexer branch 37, 39 can be designed to lead harmonics for a certain load. This is described in a US patent application entitled "Apparatus, Method and Computer Program for Radiated Harmonic Interference Reduction", which is referenced and incorporated at the cross reference paragraph above.

Note that both the cellular RF (radios 24, 26) and complementary RF (radio 28) signals have some common portions of the routing paths, though the entire paths are not wholly identical. The same filtering can be used for a second transceiver signal when the first signal is routed a different path or its radio is not active. Also, the diplexer topology can be altered according to the needed isolation given the use case at a given time. Topology and needed poles/nodes of the diplexers can be reduced with a lower power level to reduce insertion loss and power consumption. An alternate embodiment is to decrease the tunable diplexer transmission port insertion loss, with penalty for the receive signal. For example, each 0.1 dB (approximate) saving in insertion loss may decrease power amplifier current consumption up to 2%.

The third configuration of implementation is shown in FIG. 2c. Multiple sensors can be placed nearby the multiradio radios, for example a temperature sensor 29 or a proximity sensor 31. The temperature sensor 29 can monitor for example an operational temperature of an individual radio, a temperature of the power amplifiers of the individual radios, a temperature inside of the device where the implementation is included or a ambient temperature of the device (i.e. if an RF modem is inside a laptop where exist high power dissipation). The temperature of the device may change the operation and the frequency characteristics of the components. The temperature change of the components may change the expected interference scenario and thus extra filtering may be needed dependent on the operational temperature. In order to be able to compensate the changes the temperature information can be used also as a basic for the selection of the alternative routing of the radio signals. The proximity sensor 31 can detect the operational mode of the device. This sensor may be for example in a clam shell mobile phone a sensor which detects if the mobile is in a closed or in a open position. This mechanical position has an effect to the antenna isolation between antennas. In some operational modes the signal routing can be changed based on the operational mode. The reduced antenna isolation between antennas will increase the interference level in the victim radio and thus more attenuation is needed in the transmission path to secure co-existence of multiple radios. In this manner, the sensors provide inputs to the processor that sends the control signals to the diplexers and switches used to select the active pathways, and so the control signals depend on the radio use case and on the environment sensed by the sensors.

The fourth configuration of implementation is shown in the FIG. 2c shows a second antenna 23. The second antenna 23 may be used for enhancing a reception and/or transmission capability of the device. Alternatively the second antenna can be used as a primary operational antenna for at least one radio in some use modes. The second antenna 23 can be connected for example to the second radio 26. The selection of the used antenna 22 or 23 can be done by the path selection circuitry 38. The selection can be done for example based on the expected interference situation between the first radio and the third radio, received signal quality, TRP or TRS performance. Since antennas 22 and 23 are located physically at different locations, the distance between antennas provides some amount of antenna isolation between antennas. The antenna isolation acts as an extra attenuation between radios and thus the antenna isolation can be taken into account when needed attenuation between different operational radios is specified. In some operational modes the signal routing to the second antenna will give better interference attenuation and thus multiple radios can operate at the same time with less interference. The routing to the second antenna 23 can be done for example from the element 34, when it includes at least two output ports such as when implemented as a diplexer or Wilkinson divider. A first output/dedicated port is coupled to the first antenna 22 and the second output/dedicated port is coupled to the second antenna 23.

An alternative implementation for the element 34 is that element is implemented with an adjustable divider or with an adjustable combiner. The adjustable divider or adjustable combiner can be implemented for example with an adjustable Wilkinson divider. The adjustable divider or combiner can adjust the ratio of power which is provided to the output/dedicated ports or alternatively to the signal ports. For example the ratio of the power division when a transmission signal is divided between antennas 22 and 23 can be adjusted so that minimum interference is generated to other antennas and radios. Alternatively the power ratio can be adjusted to maximize the wireless communication systems data throughput between a user device (e.g., mobile terminal, laptop) and a second end of the communication system (e.g., access node, base station). Alternatively the ratio can be changed to support MIMO transmission (multiple input multiple output) and maximize the data throughput.

There is also shown a coupler element 40 in FIG. 2c. This element can detect and take sample signals from and to the antenna 22. A coupler 40 may be implemented with a capacitor coupling or with a dedicated coupler element. The coupler 40 may be implemented with lumped elements (capacitors, resistors, inductors) or with distributed elements (transmission lines). One dedicated coupler element is a bidirectional coupler, which can monitor the transmission power which is delivered through the coupler element and/or reflected power from the antenna element. The coupler element can route the detected signal or a sample of the signal to the power detection circuitry 42 which can determine a power level of the sample of a signal. The detection circuitry can detect and identify if the detected signal is a transmission signal or an interference signal. The power detection circuitry can detect for example if the interference is a harmonic interference or if it is a wide band noise. This way the power detection circuitry 42 can inform the interference situation to the path selection circuitry 38. The path selection circuitry can use this information as an input for the decision making which signal path different radios will be routed. The power detection circuitry 42 can be a dedicated circuitry or it can be a functional block or a combination of these. The power detection circuitry 42 can be integrated into any radio block or into all radio blocks. Alternatively the transmitted signal power level can be monitored with an unused (not currently operating receiver) radio block. This is done with radio block 26 in FIG. 2c. Some signal leakage may happen from a one signal port to a second signal port. This signal leakage can be measured and thus the actual signal power level can be monitored. This sample of leakage power is routed to the power detection circuitry 42. In this manner the power detection circuitry can also provide an input to a processor that sends the control signals that determine which paths are active for the use case and what the cutoff frequencies of the various diplexers are set at any given time.

Alternatively the division ratio of the element 38 can be adjusted when a reception signal is divided to multiple radios 24, 26, 28. The division ratio can be changed so that if a first radio operates with a low signal level and a second radio operates at higher signal level, then the division ratio can be altered so that the second radio receives less power than the first radio. This way both radios can maintain their operation by balancing the input signal level suitable way.

The antenna 22 can fixed frequency or tunable. Antenna resonance tuning can be done with dedicated control signals, which can be dynamically changed for different antenna matching resonances In view of the above description of simple embodiments of the invention in a multiradio device having three radios 24, 26, 28 ported to a single antenna 22 by the path-switching circuitry 38 and the tunable antenna diplexer 30, now are described extensions of that simple embodiment to a device having more radios coupled selectively to a single antenna through path-selecting circuitry and a tunable antenna diplexer. Note that the above variations as to sensors 29, 31, coupler 40 and power detection circuitry 42, and additional antennas 23 can be readily adapted to these more involved embodiments of the path selection circuitry 38.

Figure 3A:
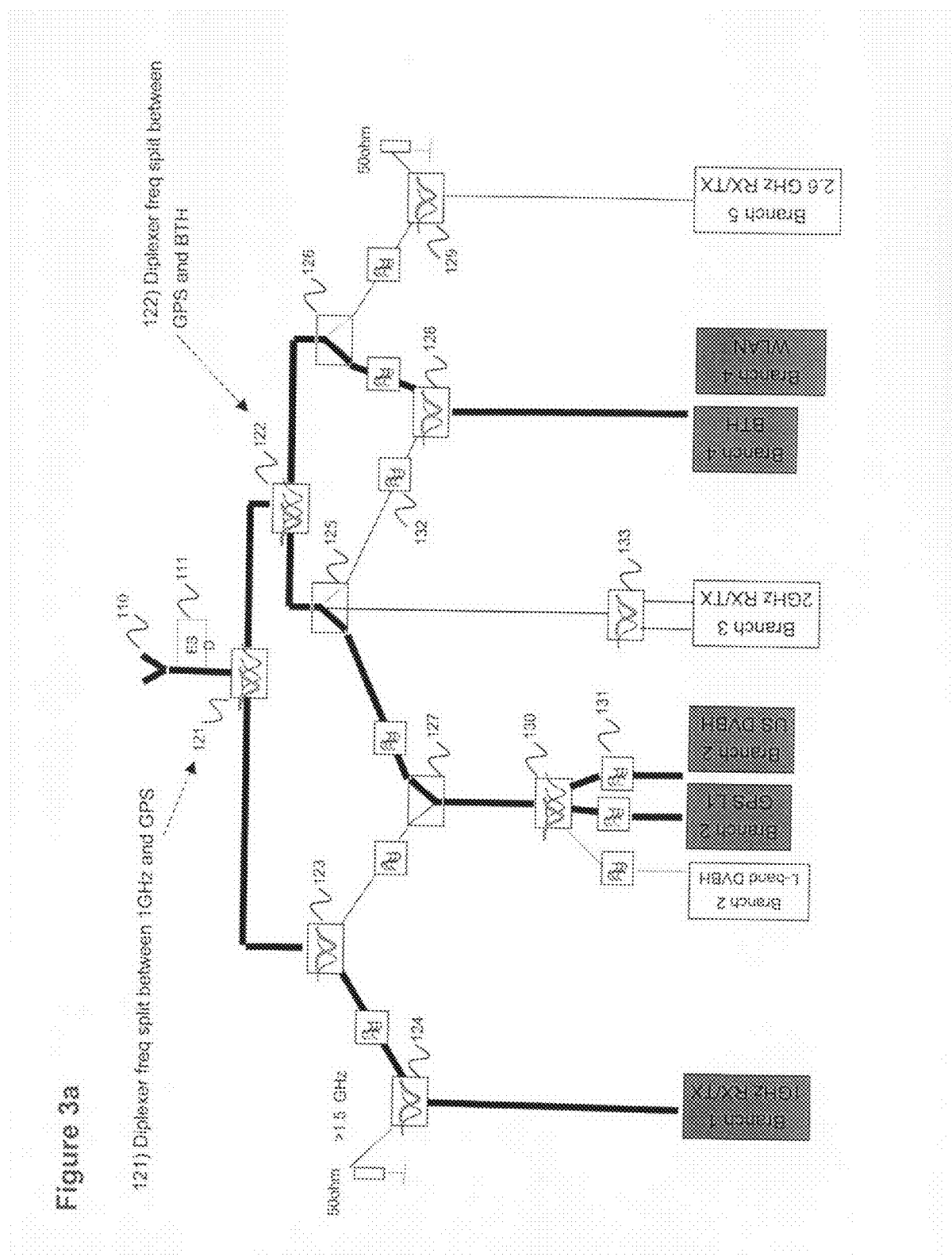

The embodiment of FIGS. 3a-3c illustrate a multiradio device with five branches and eight radios. The variations to it at FIGS. 4-7 illustrate how the circuit layout of FIGS. 3a-3c may be adapted for multiradio devices that have less than eight radios or even less than five radios for the five distinct signal pathway branches. In this manner, a single circuit layout according to these teachings can be used in a multiplicity of different handheld devices, without the need for extensive co-existence and interference testing of each different device design since they could all use the same circuit layout with different designs either utilizing or not the various branches and radio node connections of the circuit layout.

FIGS. 3a-3b are detailed with the following practical assumptions, where the active branches in operation are shown in bold signal lines and branches 2 and 4 are changeable between a first configuration/first signal pathway and a second configuration/second signal pathway. Reference numbers are common across FIGS. 3a-3c. The frequency coverage of the antenna 110 is 700-2700 MHz in these examples, and an electrostatic discharge/protection circuit 111 is shown. In order to cover a wide antenna operation bandwidth a dedicated antenna resonance tuning and/or an antenna impedance tuning may be needed. The dedicated circuitries are not shown for the clarity of the figures. As a comparison to FIGS. 2a-2b, branch 1 of FIGS. 3a-c is in the position of the first radio branch 25 of FIGS. 2a-b, branch 5 of FIGS. 3a-c is in the position of the second radio branch 27 of FIGS. 2a-b, and the two paths of branch 2 of FIGS. 3a-c is in the position of the third radio branches 37, 39 of FIGS. 2a-b.

A total of five branches may be input to the antenna 110 by FIGS. 3a-c, and their associated frequencies are assumed approximate center frequencies for the radio transceiver (combined transmitter and receiver functions). Branch 1 is a signal feed between the antenna 110 and a 1 GHz cellular frequency radio, such as low band GSM/EDGE and WCDMA/E-UTRAN. Branch 2 is a signal feed between the antenna 110 and the lower-band complementary radios, which may be any one or multiple ones of the European Union EU L-band for DVB-H, the U.S. band for DVB-H, GPS L1, L2, and/or L5 frequency receivers. Branch 3 is a signal feed between the antenna 110 and 2 GHz cellular frequencies, such as high bands of GSM/EDGE, WCDMA/LTE (I, II, III, IV, IX, UMTS 2300) transmitters/receivers. Branch 4 is a signal feed between the antenna 110 and the higher band complementary radios, such as Bluetooth and/or WLAN transmitters/receivers. Branch 5 is a signal feed between the antenna 110 and the radios operating at about 2.6 GHz cellular frequencies, including WiMax, LTE and/or WCDMA transmitters/receivers.

According to this FIGS. 3a-3c arrangement, all complementary radio receivers can be active at same time if needed in a particular radio use-case, but there is activated only one cellular connection at the same time. Thus, the possible studied radio use-cases, which are presented here as exemplary and not limiting, are:

Any radios from branches 1,2 and 4, as shown in FIG. 3a;
Any radios from branches 2,3 and 4, as shown in FIG. 3b; and
Any radios from branches 2,4 and 5, as shown in FIG. 3c.

For these various radios, assume the following center frequencies:

| | |
|---|---|
| 1 GHz: | cellular LOW band; QB GSM/EDGE, WCDMA/E-UTRAN (bands V, VI, VIII, XII, XIII, XIV) |
| 1.4 GHz: | EU L-band DVB-H, GPS L1, L2 and L5 frequencies, WCDMA/LTE (band XI) |
| 1.6 GHz: | US DVB-H |
| 2 GHz: | cellular MID band; GSM, WCDMA/LTE (bands I, II, III, IV, IX, X), |
| 2.4 GHz: | WLAN/BTH (Wireless LAN/Bluetooth) |
| 2.6 GHz: | cellular HIGH band; WCDMA/LTE (VII) |

It is noted that newer technology radios (e.g., upper wideband UWB, WLAN 5 GHz) at higher frequencies are anticipated. Such higher-frequency radios may be connected to same multiradio front end as shown in FIGS. 3a-3c or those new radios can have their own antenna, such as for example a printed wiring board antenna(s).

There are two separate operational standards in the WCDMA systems. Currently implemented WCDMA systems are based on the FDD (Frequency Division Duplex) standard which means that transmission and reception frequencies are separated from each other by duplex frequency. In some coming WCDMA band allocations a duplex frequency separation or a frequency difference between a transmission and a reception frequency is wide compared to the operational frequency. Thus for example the transmission of the system may use a branch number 3 and the reception may use a branch number 5. These transmission and reception can be considered as a separate transmission and reception, when interference scenario and needed attenuation between different radios are considered. The second WCDMA operational standard is based on TDD (Time Division Duplex) which separates the transmission and reception in time domain separate operational times. The TDD system can be deployed with one operational frequency which is shared by transmission and reception. The table above shows FDD operational bands and TDD operational bands are about the same frequencies. This way for example branch 3 WCDMA transmitter can be modified to support both FDD and TDD systems.

Now consider FIG. 3a in particular, where any combination of the radios along branches 1, 2 and 4 can be actively coupled to the antenna 110 at a given time. For example, assume branch 1 couples to a 850 MHz GSM radio (1 GHz), branch 2 couples to a GPS L1 (1.57 GHz) receiver and to a US DVB-H receiver (1.6 GHz), and branch 4 couples to a Bluetooth transceiver and/or to a WLAN transceiver as illustrated. Since some of these radios are receiver-only, FIG. 3a is described with reference to a received signal. The multiradio antenna 110 is tunable for multi frequency functionality. The actual circuitry is not shown for the clarity for the figure. The tunable antenna diplexer is shown at 121; other tunable diplexers are numbered: first diplexer 122; second diplexer 123; third diplexer 128; fourth diplexer 130; fifth diplexer 124; and sixth diplexer 129. At the antenna diplexer 121, the input selection of the desired signal is based on interference frequency (frequencies). The diplexer 121 operates in this use case to split frequency between the 1 GHz signal at the left side (the first signal port) and the 1.57 GHz L1 GHz signal (and above for US DVB-H, BT and WLAN) at the right side (the second signal port) of the diplexer 121. This frequency split is set by controls specifically adapted for this use-case, which may be stored in a local memory of the multiradio device and input from a processor over a control lead to the diplexer 121. The processor knows which radios are active and thus can readily determine the use-case at any given time and a needed attenuation between different operational radio systems. The processor can decide the use radio signal path which is optimal from interference attenuation point of view in order to guarantee the co-existence of multiple radios. The processor can decide if an extra filter is needed on top of the filtering characteristics of the diplexers to secure parallel operations. The diplexer 121 splits the signal from the antenna 121 and outputs a 1 GHz and below cellular signal at its left side, and also attenuates that same clipped signal for cellular harmonics and a wide band noise according to this use-case. For the signal output to the left side, the diplexer 121 also operates as a low pass filter, filtering the 1 GHz and below signal to the 850 MHz center frequency of the radio at the end of branch 1. The diplexer 121 outputs from that split antenna signal a 1.57 GHz and higher signal from the second signal port on its right side. The filtering characteristics of the diplexer may also attenuate for the 2.4 GHz WLAN portion of that high-pass filtered signal. From this perspective it operates as a high pass filter, also filtering to achieve the 1.57 GHz and above signal as well as splitting it from the total signal received from the antenna.

Following the first branch, the signal then passes through the second tunable diplexer 123 (alternatively the first branch tunable diplexer 123), which is tuned to pass a signal based on interference frequency for that use-case. For the FIG. 3a use-case where the 1 GHz cellular radio is connected along branch 1, the second tunable diplexer 123 sends the 1 GHz and below frequency signal toward the cellular radio along the bolded branch 1 signal path shown. For the use-case of FIGS. 3b and 3c, the second tunable diplexer 123 sends the 1.57 GHz and above signal to the branch 2 GPS L1 and/or US DVB-H receivers. The second tunable diplexer 123 thus splits in frequency the signal among the first branch radio(s) and the second branch radio(s), but as the circuit is arranged in FIGS. 3a-c only one of those two branches actively receives a signal from the low pass side (left side) of the antenna tunable diplexer 121 so the second tunable diplexer 123 acts as a switch. In an embodiment this diplexer 123 may be a simple switch, but as a diplexer 123 it performs the additional functions of acting as a harmonic notch filter and attenuating cellular harmonics, regardless of the filtering/passband at the antenna diplexer 121.

In an alternative embodiment any of the diplexers or switches may be an adjustable divider such as a Wilkinson divider. The division ratio of the adjustable divider can be changed according to the use case. This way the power ratio between different signal ports can be adjusted and thus the performance degradation of the different radios can be balanced due to several combinations and divisions between radios and antennas. In some cases a received signal can be attenuated more than a transmitted signal without the opposite end of the communication noticing any degradation of the communication quality.

In an alternative embodiment there can be a complementary radio (e.g DVB_H digital video broadcast for handheld devices) receiver at the lower side of the 1 GHZ transmit frequencies. Power amplifiers can generate excessively wide out-of-band noise, which degrades or prevents signal reception. At least one tunable diplexer(s) 124 and 123 can be set to a high pass state according to the power level to filter noise to receivers at the low side. Generally higher power levels generate higher noise levels.

In an embodiment not illustrated, the antenna tunable diplexer 121 may split the received signal between 1.6 GHz and 2.4 GHz, outputting the lower frequency signal from that split out the low pass left side of the antenna diplexer 121 which is then split at the second tunable diplexer 123 between 1 GHz for the low band cellular along branch 1 and 1.57 GHz for the GPS L1 and/or US DVB-H radios along branch 2.

Further in FIG. 3a is an optional fifth diplexer 124 (first branch load balancing diplexer 124) that has a low pass port for the cellular 1 GHz radio and a high pass port for a termination to load, shown as a 50 Ohm termination for filtering out a cellular harmonics and wide band noise of transmissions. In an alternative embodiment the termination can be a filtering structure or the like. The termination can contain multiple implementation possibilities (load, low pass, high pass, phase matching), of which at least one is selected according to the interference scenario.

Consider again in FIG. 3a the high band signal output from the right side of the tunable antenna diplexer 121, which by example is 1.57 GHz and above and as can be seen is input to the first tunable diplexer 122. The wanted signal input selection is based on interference frequency for the current use-case, and in this FIG. 3a configuration the first tunable diplexer 122 is tuned to split frequency between 1.57 GHz and 2.4 GHz according to the control inputs deriving for this use-case. The low pass output/dedicated port from the first diplexer 122 goes toward a third switch 127 and the branch 2 receivers GSP L1 and US DVB-H. The antenna tunable diplexer 121 attenuates branch 1 harmonics and wide band noise to branch 2 and branch 4. The first tunable diplexer 122 attenuates WLAN noise from branch 4. The high band of the signal split at the first tunable diplexer 122 is sent to the branch 4 radios BT and/or WLAN through a second switch 126 and the third tunable diplexer 128, also attenuating that high band WLAN signal from the lower band signals sent toward branch 2.

The first switch 125 is a branch selector, as illustrated a three way switch (one node to three poles) to select whether to connect the low band node (left side) of the first tunable diplexer 122 to branch 2 and the low band complementary radios, branch 3 the mid band cellular radio, or branch 4 and the high band complementary radios. The second switch 126 is similar, but a two-way switch to select whether to connect the high band node (right side) of the first diplexer 122 to branch 4 and the high band complementary radios or branch 5 and the high band (2.6 GHz) cellular radio. Alternatively the switches 125 and 126 can be implemented with an adjustable divider.

The third switch 127 is a routing selector, also a two way switch, to select whether branch 2 and its low band complementary radios are coupled to the low band node (left side) of the antenna tunable diplexer 121 (via the second diplexer 123), or to the high band node (right side) of the antenna tunable diplexer 121 (via the first switch 125 and first diplexer 122). This selection is done based on interference frequency; e.g., the low band cellular (1 GHz) is present in the FIG. 3a use-case so the branch 2 complementary radio(s) are routed to the high band node (right side) of the tunable antenna diplexer 121. Further along branch 2 is a fourth diplexer 130 that acts as a receiver selector; a one to x switch where x is the number of receivers on branch 2. As shown, x=3 for the three low band complementary radios L-band DVB-H, GPS L1 (can also be L1, L2 and/or L5) and US DVB-H, so the fourth diplexer 130 is a triplexer. Throughout FIGS. 3a-c are shown various band pass filters such as 131 and 132 that improve blocking performance between routings. Alternatively those additional filters such as 131 and 132 attenuate the wide band noise and harmonics of the transmissions. Alternatively there can be two output/dedicated ports for the diplexer 130. A second antenna 150 is shown in FIG. 3c. In some interference situations it is better to route the branch 2 complementary radios to the second antenna 150 instead of antenna 110. This situation can occur when the user is loading the first antenna 110 e.g. by hand at top of the antenna 110. This can change the operational impedance of the antenna 110 and thus the interference situation for the complementary radios from branch 2 to be worse, and in order to maintain reception the branch 2 radios are routed to the antenna 150.

Along branch 4, the third tunable diplexer 128 also operates as a two way switch, and may be a switch, a adjustable divideror may be a diplexertuned to select whether branch 4 is connected to the low band node (left side) of the first tunable diplexer 122 (via the first switch 125) or to the high band node (right side) of the first tunable diplexer 122 via the second switch 126). As with the third switch 127, route selection via switch position or tuning parameters is selected based on the interference frequency given by the use-case. When the branch 2 receiver(s) is/are on and operating, routing of the high band complementary radios (BTH and WLAN) along branch 4 is through the high band node (right side) of the first diplexer 122. If instead the low band complementary radios along branch 2 are off or not operational, then the high band complementary radios can be connected through branch 4 to the low band node (left side) of the first tunable diplexer 122, or they may be connected to both the high band and low band nodes of that diplexer 122.

The optional sixth tunable diplexer 129 is tuned to pass as its low pass port the 2.6 GHz cellular (FDD or TDD, WiMax) signals, with its high pass port terminated at a load termination (50 Ohms) for filtering out harmonics and wide band noise of transmission.

The optional seventh tunable diplexer 133 is tuned to operate as a duplex filter when the branch 3 radio supports FDD systems. In this mode the frequency characteristics are changed so that it operates as a normal diplex filter with low pass filtering for the first signal port and high pass filtering for the second signal port. When the branch 3 radio supports a TDD system then the frequency characteristics are changed so that it operates as a band pass filter. The signal port filter characteristics are changed between transmission and reception operational times when supporting a TDD system.

The use-case of FIG. 3b finds the circuit configured to connect branch 2 to the low band node (left side) of the antenna tunable diplexer 121 via the second tunable diplexer 123 and the third switch 127. Also in the FIG. 3b use-case, both branch 3 (mid-band cellular radio) and branch 4 (BTH and WLAN) are connected to the high band node (right side) of the antenna tunable diplexer 121 via opposite band nodes of the first diplexer 122, which is tuned to split frequencies between BTH and 2 GHz according to the use-case. The low band 1 GHz and high band 2.6 GHz cellular radios are not actively coupled to the antenna 110.

The use case of FIG. 3c find the circuit configured identically to that of FIG. 3b along branches 1 and 2. But for FIG. 3c it is the branch 4 radios (BTH and WLAN) and the high band cellular radio (2.6 GHz) that are coupled to opposite band nodes of the first tunable diplexer 122, this time the high band complementary radios connected to the low band node (left side) of the first tunable diplexer 122 along branch 4. For the use case of FIG. 3c, the antenna tunable diplexer is tuned to split frequency between GPS and WLAN (2.4 GHz), and the first tunable diplexer 122 is tuned to split frequencies between 2.485 GHz and 2.5 GHz. Also in FIG. 3c the 50 Ohm termination is active through the sixth diplexer 129 in order to filter out the harmonic transmissions of the high band 2.6 GHz cellular radio. Branch 4 and 5 radios are very close each other in the frequency domain. In an embodiment (not illustrated), the 2.6 GHz signal can be fed to the high pass port and the low pass port can be connected to a suitable termination. In this embodiment the branch 5 radio that is adjacent and an interference to branch 4 from an adjacent and/or alternate channels or from a wide band noise can be reduced.

Functionally, the antenna tunable diplexer 121 (and at least the first diplexer 122) operate as a splitter and as a combiner. As a splitter, the tunable diplexer pass band is configured according to wanted signal path. The low pass port is selected for the path where attenuation is needed for higher frequencies, blocking, harmonics and noise requirements. The high pass port is selected for the path where attenuation is needed for lower frequencies, blocking and noise. Whenever the multiradio use-case changes, the tunable diplexer(s) is/are configured accordingly.

As a combiner, the tunable diplexer low pass (LP) and high pass (HP)-3 dB frequency is configured according the present multiradio use-case frequencies so that the low pass branch provides attenuation for frequencies from −3 dB corner frequency frequencies upwards, and the high pass branch provides attenuation for frequencies from −3 dB frequencies downwards. At pass band there can still be signals for several radios with feasible attenuation. And when the multiradio use-case changes, the tunable diplexer(s) is/are configured accordingly. Further as a combiner, the input port (high band or low band) of the tunable diplexer is selected according to the present interfering transmit signal frequency (use-case). If the interference transmit frequency is lower than the receive signal frequency, then the receive signal is routed to the diplexer high pass node. If instead the interference transmit frequency is higher than the receive signal, then the receive signal is routed to the diplexer low pass node. And of course when the multiradio use-case changes, the tunable diplexer is re-configured accordingly.

The tunable diplexer −3 dB corner frequency can be configured to the transmit/receive band edge or channel edge, or between the above radio frequencies. When attenuation starts from the edge of channel, then frequency separation is wider than with a fixed duplexer. This enables the lower insertion loss to passband and higher attenuation to unwanted frequencies. Insertion loss is taken account in filtering of multiradio RF front end system calculations, and so band filtering between the multiradio module as in FIGS. 3a-3c and the radio transceivers/power amplifiers can be relaxed. The total insertion loss depends on the band filtering architecture. But since band filtering can be done on the tunable diplexer structures, or the like, the insertion loss should be comparable or even less.

Alternatively all mentioned tunable diplexers the phase characteristics of each individual port can be changed. The operational phase of the filter at the operational pass band of the filter and at the attenuation band of the filter is important. The change of the phase to a certain phase angle can reduce either the pass band insertion loss or improve the attenuation at the attenuation band. The controlling signals are not shown in any FIGS. 2-8 due to clarity of the figures. The phase rotation element can be integrated into the filter or it can be a separate component coupled to the signal ports or to the output dedicated port.

Signal routing can be done with switches in those nodes where isolation is needed. On some nodes can be used triplexers to split signal to 3 pathways (e.g., split a GPS reception signal to L1, L2 and L5 frequencies). As seen at 131 and 132, there may be fixed filtering also between the nodes described with particularity, for blocking requirements. In an alternative embodiment there can be tunable filter structures or the like between nodes. These filters pass a selected passband and the attenuation properties can be tuned according to the present interference scenario. An alternative embodiment is that when the use case changes during the operation of the multiradio terminal, then during the operation at least one filter can be bypassed, if a needed co-existence filtering attenuation can maintained without extra filtering.

The radio front end circuitry of FIGS. 3a-3c (or the simpler embodiment of FIGS. 2a-2c) for a mobile handheld device can be manufactured within a module that is later assembled into the completed device (e.g. low temperature co-fired ceramic LTCC technology) using micro-electro-mechanical systems MEMS capacitors. Such a module may include optionally electrostatic discharge protection, antenna matching and/or resonance tuning circuits, and/or couplers for TRP/TRS performance optimization. Such modules may have controls to configure alternate routings and filtering according to the different multiradio use-cases. A controlling unit such as a digital processor or other controller can also be attached to the module, a transceiver, a multiradio controlling unit or baseboard. Control signals themselves may be generated by a microcontrol unit MCU, a digital signal processor DSP, or both. Software algorithms may be employed to use those control signals more efficiently. RF front-end filtering can also be manufactured on a different module. If a multiradio use-case interferences are not limiting its performance, then an optimal route/branch is selected, optimum being in a performance sense (e.g. in TRP, TRS, or power consumption). Also, for a device where one or more radios operate on a time divided transmission system (e.g., a discontinuous reception period or similar concept), the signaling pathways can be configured differently when transmissions are active as compared to when transmissions are not allowed (e.g., sleep mode) for that those radios.

A related application entitled "Low power transmission with reception diversity antenna", filed Dec. 28, 2007, can be combined with these teachings to feed the main RF transmit chain.

As noted above, the embodiment of FIGS. 3a-3c can be used in other devices with fewer radios by simply leaving the appropriate nodes unconnected. These are shown in FIGS. 4-8 by shading, and these drawings also illustrate different embodiments of the circuit module in which the shaded portions may be absent entirely. Alternatively those shaded portions or not needed functionalities can be temporality powered down in order to save operational current.

Figure 4:
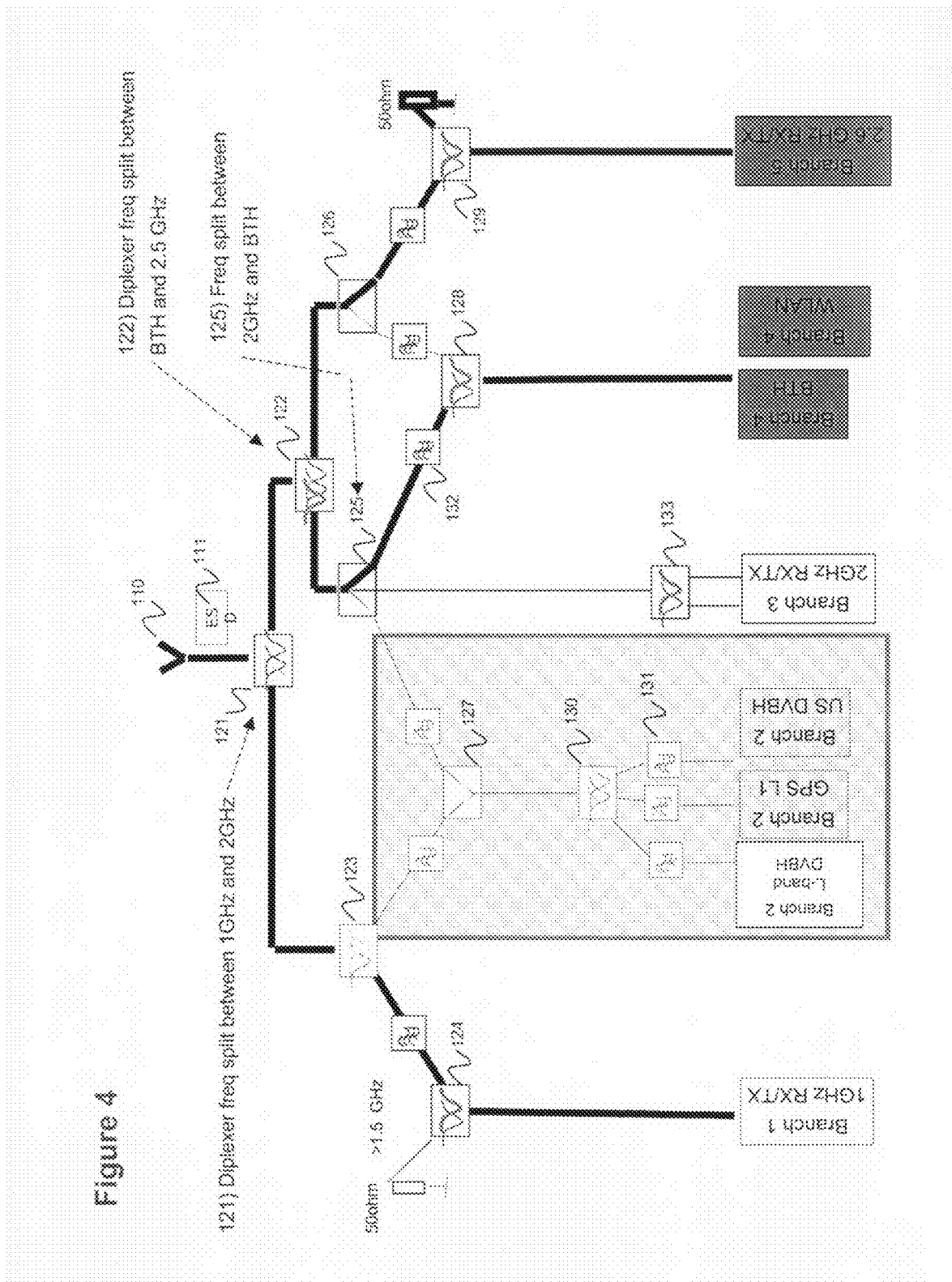
FIG. 4 is similar to FIGS. 3a-3c but with one of the radios having alternate branches is blanked to represent a radio lacking those components.

FIG. 4 illustrates an embodiment wherein the low band complementary radios are absent from the overall device, and so the module either leaves branch 2 as a non active stage or the shaded components are absent. Branches 1, 3, 4 and 5 of FIG. 4 may be coupled to the same antenna.

Figure 5:
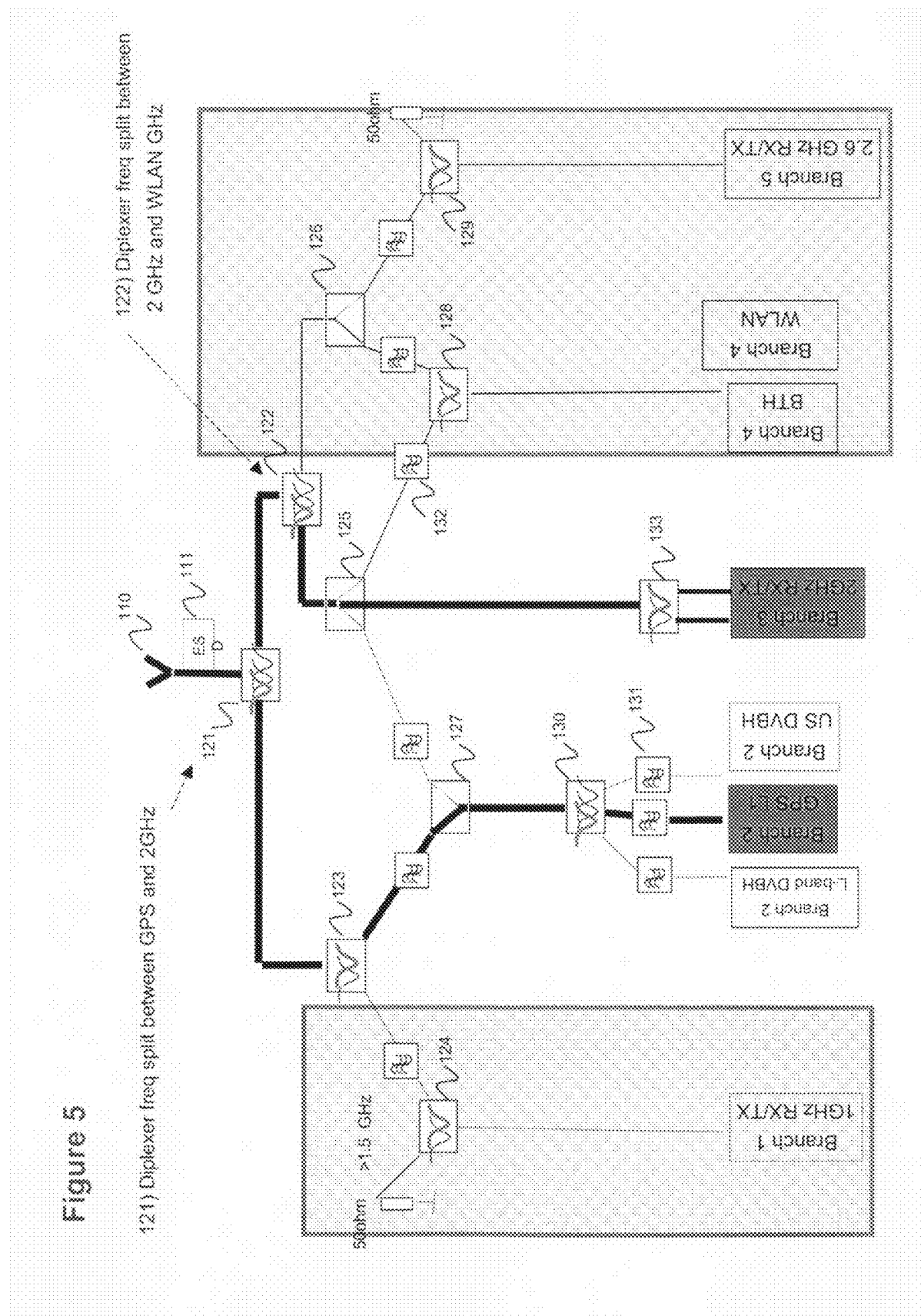
FIG. 5 is similar to FIG. 4 but with three radios blanked.

FIG. 5 illustrates an embodiment wherein the low and high band cellular radios and the high band complementary radios are absent from the overall device, and so the module either leaves branches 1 and 4 and 5 as a non active state or the shaded components are absent (or some combination of the two). Branches 2 and 3 may be coupled to the same antenna.

Figure 6:
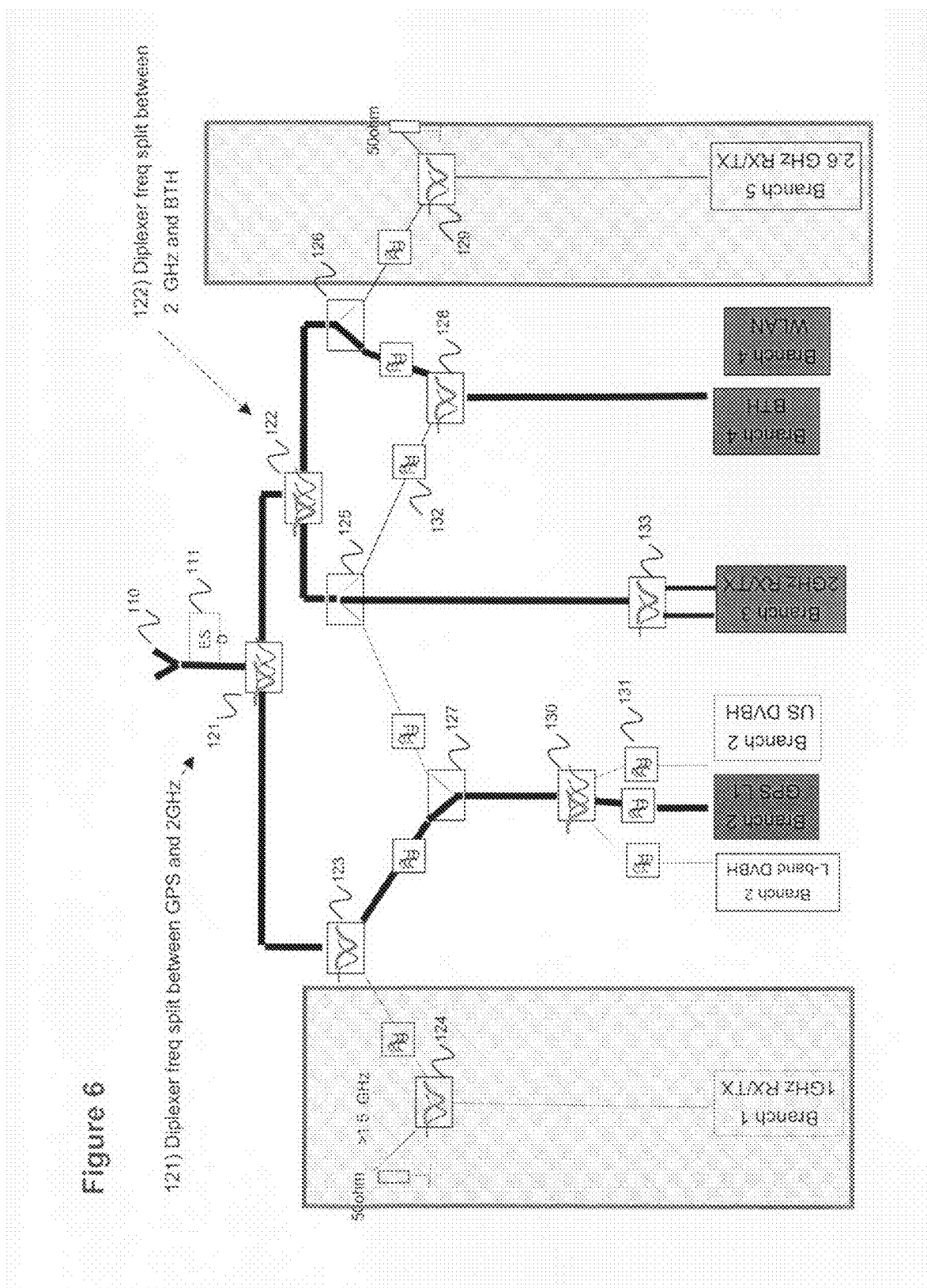
FIG. 6 is similar to FIG. 4 but with two radios blanked, neither having alternate branches.

FIG. 6 illustrates an embodiment wherein the low and high band cellular radios are absent from the overall device, and so the module either leaves branches 1 and 5 as a non active state or the shaded components are absent (or some combination of the two). Branches 2, 3 and 4 may be coupled to the same antenna.

Figure 7:
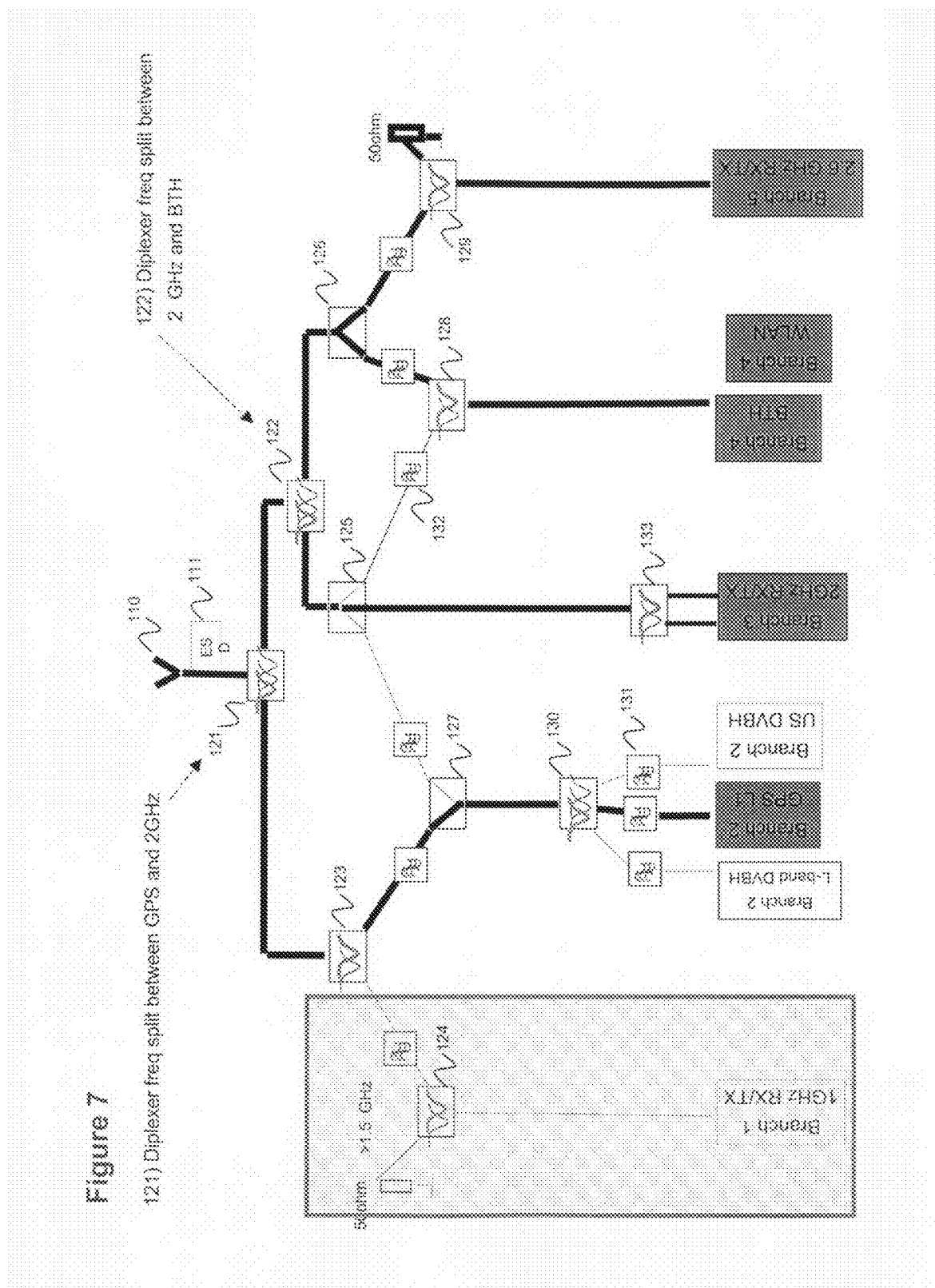
FIG. 7 is similar to FIG. 4 but with one radio blanked having a single branch to the antenna.

FIG. 7 illustrates an embodiment wherein the low band cellular radio is absent from the overall device, and so the module either leaves branch 1 as a non active state or the shaded components are absent. Branches 2, 3, 4 and 5 may be coupled to the same antenna.

Figure 8:
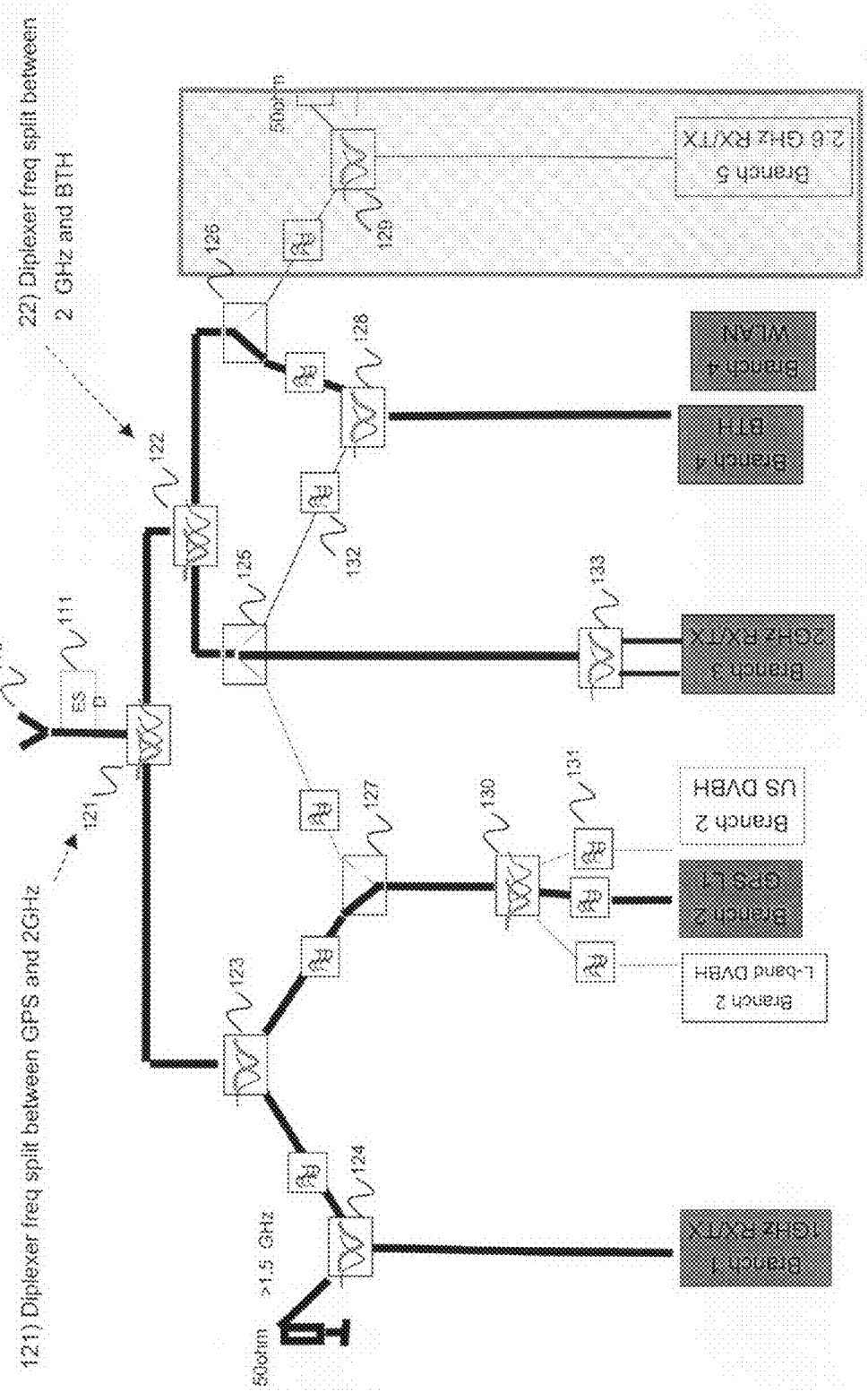
FIG. 8 is similar to FIG. 7 but with a different radio blanked having a single branch to the antenna.

FIG. 8 illustrates an embodiment wherein the high band cellular radio is absent from the overall device, and so the module either leaves branch 5 as a non active state or the shaded components are absent. Branches 1, 2, 3 and 4 may be coupled to the same antenna.

All of the multiradios detailed above can be placed to same main antenna without substantial interoperability problems. Also, the same multiradio front end as described above can be duplicated in the same multiradio device for coupling to a diversity antenna. Following are some specific benefits that may accrue from employing an exemplary circuit according to these teachings. GPS signals can be received without performance degradation during a GSM transmit slot. The 2.6 GHz LTE band and the ISM band can be used by the same device at the same time; interoperability is not limited. A 2.6 GHz LTE duplexer can be optimized for transmit insertion loss instead of WLAN isolation as detailed above. The low band cellular harmonics to the US DVB-H and WLAN and Bluetooth is avoided. Cellular harmonics and wideband noise to 2.6 GHz and higher complementary wireless frequency bands are attenuated. Reception of GPS L1, L2 and L5 frequencies enables GPS frequency diversity reception with higher accuracy. Because there is only one antenna needed, there are no problems due to interferences due to coupling via other antennas (though this is not wholly avoided if a diversity antenna is needed). Future wireless products are anticipated to need a wideband antenna or an antenna with multiple tunable resonances, which this circuit layout is compatible with. Only one antenna existence needs to be tested (diversity antenna embodiments excepted).

This is seen to be a whole new approach to do an RF front end in a multiradio device, using existing technology/components to yield a module/chipset useable in a multiplicity of device designs with savings in number of antennas, number of switches, material costs, and substantially reduced testing from a practical point of view since the same module is used in devices with 3, 4, etc radios. A corresponding implementation is not possible with fixed frequency diplexer or duplexer.

In the exemplary embodiments of the invention as detailed above, the cellular radio connection can have a first receiver active in any branch and a second receiver also active. This is useful for listening with one of the receivers on other channels such as for handover information. The RF architecture detailed herein can have a cellular connection to a traditional base station/nodeB/e-nodeB and another cellular connection to another mobile terminal and/or to a femtocell at the same time. In another implementation the mobile terminal embodying the invention can send a message to the base station, other terminal, femtocell and/or some other connected device where the terminal embodying the invention adjusts its multiradio interoperability using the control signals, and the message informs the recipient of the multiradios in use (the active radios). The control signals can actuate the multiradio front end filtering and band filtering to adjust to achieve needed performance metrics for the radios in use for the use case; or the path can be selected so as to provide better TRP/TPS performance for the radios in use. As noted above, not all the elements shown as diplexers need to be embodied as a diplexer per se; some may be implemented equivalently as an isolator, a tunable isolator, a circulator, a tunable circulator, a fixed filter, and/or a tunable filter, of which there may be a bypass pathway to avoid the component where its frequency filtering/isolating characteristics are not tunable. Also, the control signals that set the transmit filtering partitioning can be altered according to the reception signal quality or signal level. While a temperature sensor 29 was shown in FIG. 2c, note also that this may be adapted to measure surface temperature.

Figure 9:
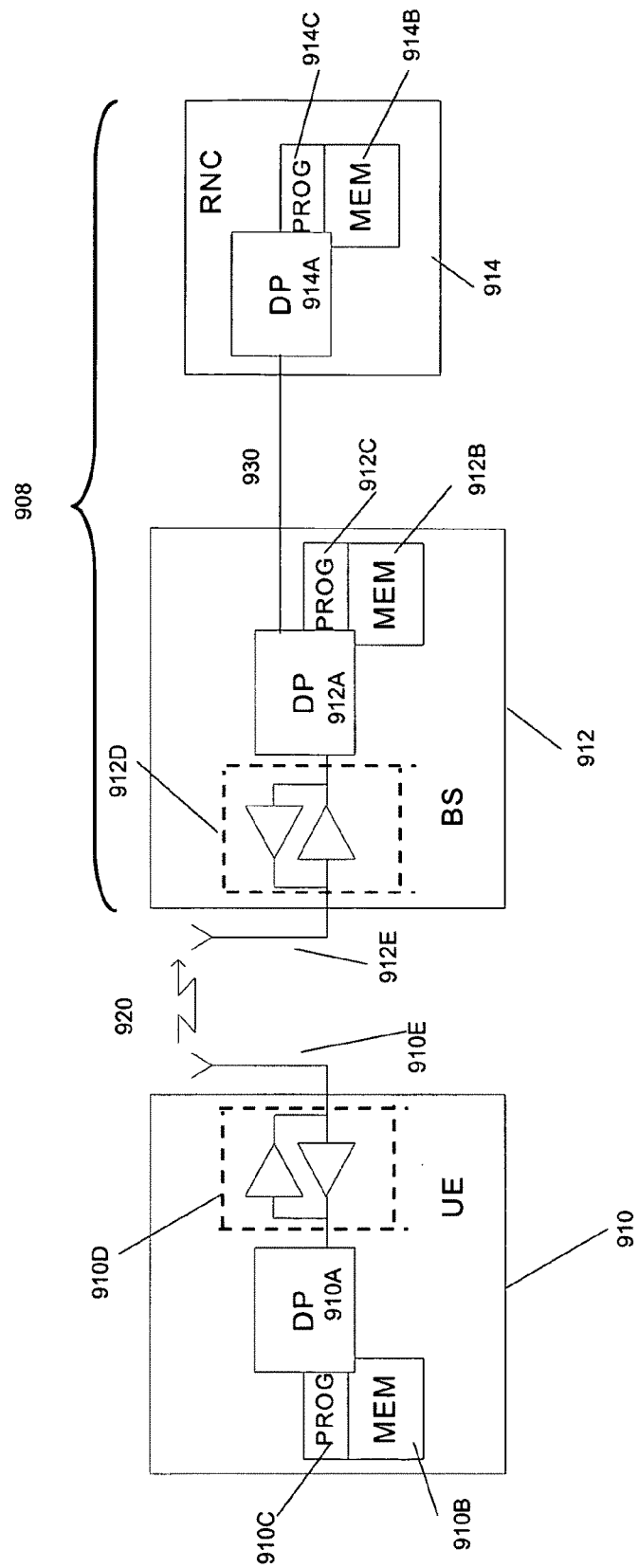
FIG. 9 shows a simplified block diagram of various electronic devices that are suitable for use in practicing the exemplary embodiments of this invention.

Reference is now made to FIG. 9 for illustrating a simplified block diagram of various electronic devices that are suitable for use in practicing the exemplary embodiments of this invention. In FIG. 9 a wireless network 908 is adapted for communication between a UE 910 and a Node B 912 (e-Node B or access node known by various terms in various different wireless communication systems). The network 908 may include a gateway GW/serving mobility entity MME/radio network controller RNC 914 or other radio controller function known by various terms in different wireless communication systems. The UE 910 includes a data processor (DP) 910A, a memory (MEM) 910B that stores a program (PROG) 910C, and a plurality (one shown) of suitable radio frequency (RF) radios (receivers, transmitters, or transceivers) 910D coupled to one or more antennas 910E (one shown) for bidirectional wireless communications over one or more wireless links 920 with the Node B 912, 910 and 912 may have multiple antennas to support multiple input multiple output operation.

The term "coupled" means any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The Node B 912 also includes a DP 912A, a MEM 912B, that stores a PROG 912C, and one or more (one shown)

suitable RF radios (receivers, transmitters, or transceivers) 912D coupled to one or more antennas 912E (one shown). The Node B 912 may be coupled via a data path 930 (e.g., Iub or S1 interface) to the serving or other GW/MME/RNC 914. The GW/MME/RNC 914 includes a DP 914A, a MEM 914B that stores a PROG 914C, and a suitable modem and/or transceiver (not shown) for communication with the Node B 912 over the Iub link 930.

In one environment, the UE 910 uses its multiradios configured according to an embodiment of this invention to communicate to a plurality of network nodes such as the BS 912 each using one or more different radios, examples of which are detailed above. In another environment, both the UE 910 and the BS 912 communicate with one another using different ones of the multiradios, and at least one of the UE 910 and the BS 912 include an embodiment of this invention. In yet another environment, a single BS 912 according to an embodiment of this invention communicates with different UEs 910 using different ones of its multiradios.

At least one of the PROGs 910C, 912C and possibly 914C (for the case where the data link 930 is wireless and communication between the MME 914 and the BS 912 is via multiradios) is assumed to include program instructions that, when executed by the associated DP, enable the electronic device to operate in accordance with the exemplary embodiments of this invention, as detailed above. Inherent in the DPs 910A, 912A, and 914A is a clock to enable synchronism among the various apparatus for transmissions and receptions within the appropriate time intervals and slots required.

The PROGs 910C, 912C, 914C may be embodied in software, firmware and/or hardware, as is appropriate. In general, the exemplary embodiments of this invention may be implemented by computer software stored in the MEM 910B and executable by the DP 910A of the UE 910 and similar for the other MEM 912B and DP 912A of the Node B 912, or by hardware, or by a combination of software and/or firmware and hardware in any or all of the devices shown.

In general, the various embodiments of the UE 910 can include, but are not limited to, mobile stations, cellular telephones, personal digital assistants (PDAs) having wireless communication capabilities, portable computers having wireless communication capabilities, WWAN (Wireless Wide Area Network) modem having wireless communication capabilities, WLL (Wireless Local Loop) device, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 910B, 912B and 914B may be of any type suitable to the local technical environment and may be implemented using any suitable data storage technology, such as semiconductor-based memory devices, magnetic memory devices and systems, optical memory devices and systems, fixed memory and removable memory. The DPs 910A, 912A and 914A may be of any type suitable to the local technical environment, and may include one or more of general purpose computers, special purpose computers, microprocessors, digital signal processors (DSPs) and processors based on a multi-core processor architecture, as non-limiting examples. Further in this regard it should be noted that the various logical step descriptions below may represent program steps, or interconnected logic circuits, blocks and functions, or a combination of program steps and logic circuits, blocks and functions.

Figure 10:
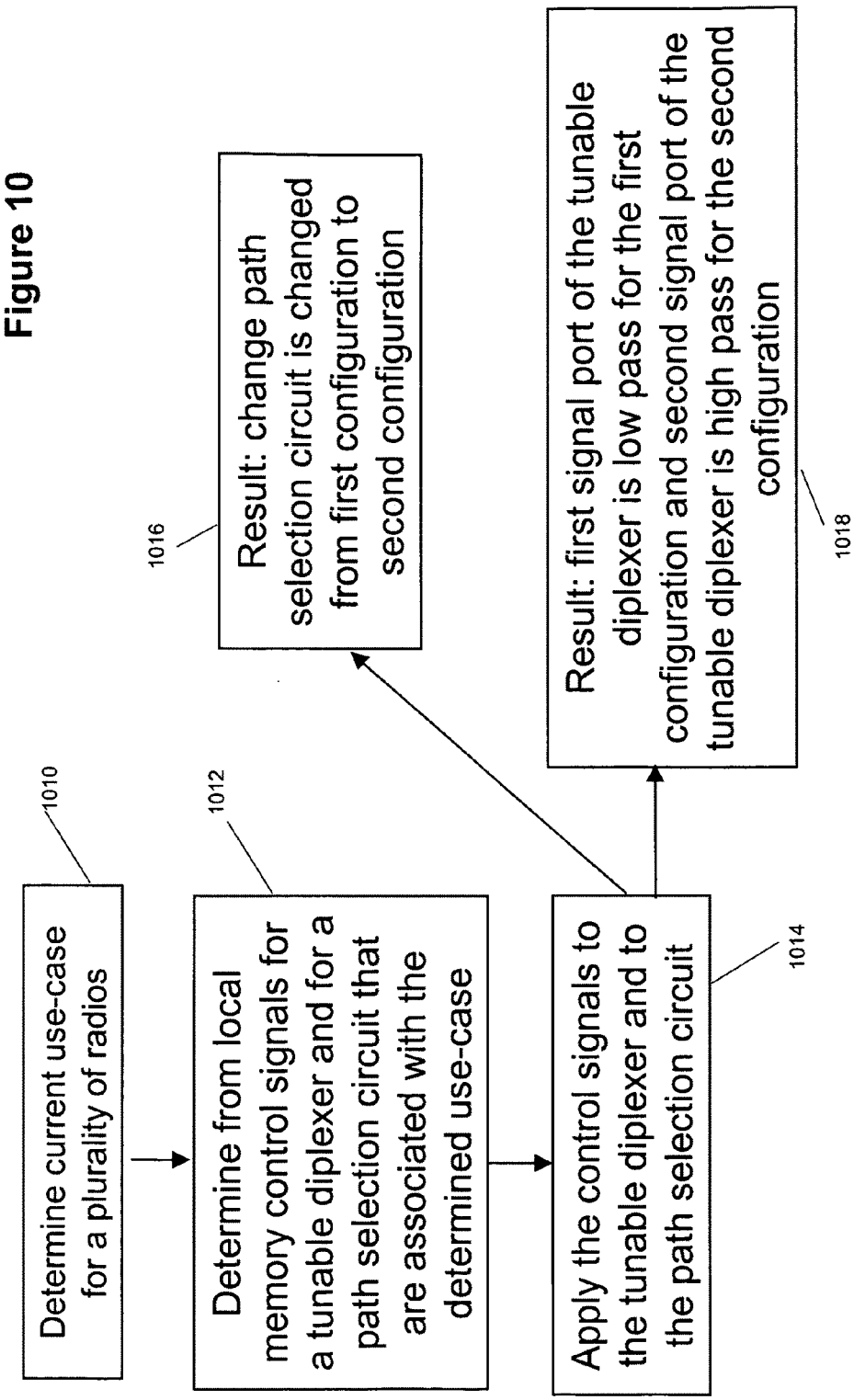
FIG. 10 is a flow diagram representing process steps or functional circuitry to implement an exemplary embodiment of the invention.

Such program steps are shown at FIG. 10. At block 1010 a current use case is determined for a plurality of radios of a device. The use-case is what radios are currently active, either in the transmission or reception mode, and which are inactive, whether not in use and fully off or in some embodiments also which are in a sleep or partially depowered mode. The needed filtering requirements between each radio are defined in block 1010. The needed attenuation from a one radio to a second radio can change during the operation of the device or based on the operational conditions of the device. The operational conditions of the device are for example: an operational frequency of the transmission or reception of a first radio, an operational frequency of the transmission or reception of a second radio, a power level of a received signals, used modulation methods, harmonic frequencies generated by radio blocks, harmonic power level generated from a radio block, timings of the receptions and transmissions of a radios, a number of sub-carriers of a reception or transmission, operational temperature of the device, data rates of a signals. An expected interference scenario is a subtraction of expected interference level generated from the interference radio and available attenuation from interference radio to victim radio. The at least one of the signal ports or the output/dedicated port a frequency characteristics and/or phase of the signal path may be altered at least one or any combination of previously mentioned operational conditions. Alternatively an expected interference signal level in the victim radio input can be used as a basis for the signal path selection. At block 1012, a local memory is accessed to determine control signals based on an expected interference scenario in victim radio for a tunable diplexer and a path selection circuit that is appropriate to the current use-case. Such an association between use-case and control signals may be in a lookup table or similar arrangement, and this association in the memory is stored prior to the time the current use-case is determined. At block 1014 the control signals are applied to the tunable diplexer and to the path selection circuit, which causes the path selection circuitry to switch at block 1016 from a first configuration to a second configuration. The first configuration couples a radio port of the path selection circuit to a first signal port of the tunable diplexer via a first circuit branch through the path selection circuit, and the second configuration couples the radio port to a second signal port of the tunable diplexer along a second circuit branch through the path selection circuit. Application of the control signals also tunes at block 1018 the tunable diplexer so that its first signal port operates as a low pass filter in the first configuration, and its second signal port operates as a high pass filter in the second configuration. Note that blocks 1016 and 1018 may be simultaneous or very closely spaced in time, and if the latter the order may be reversed as compared to the order shown in FIG. 10.

Figure 11B:
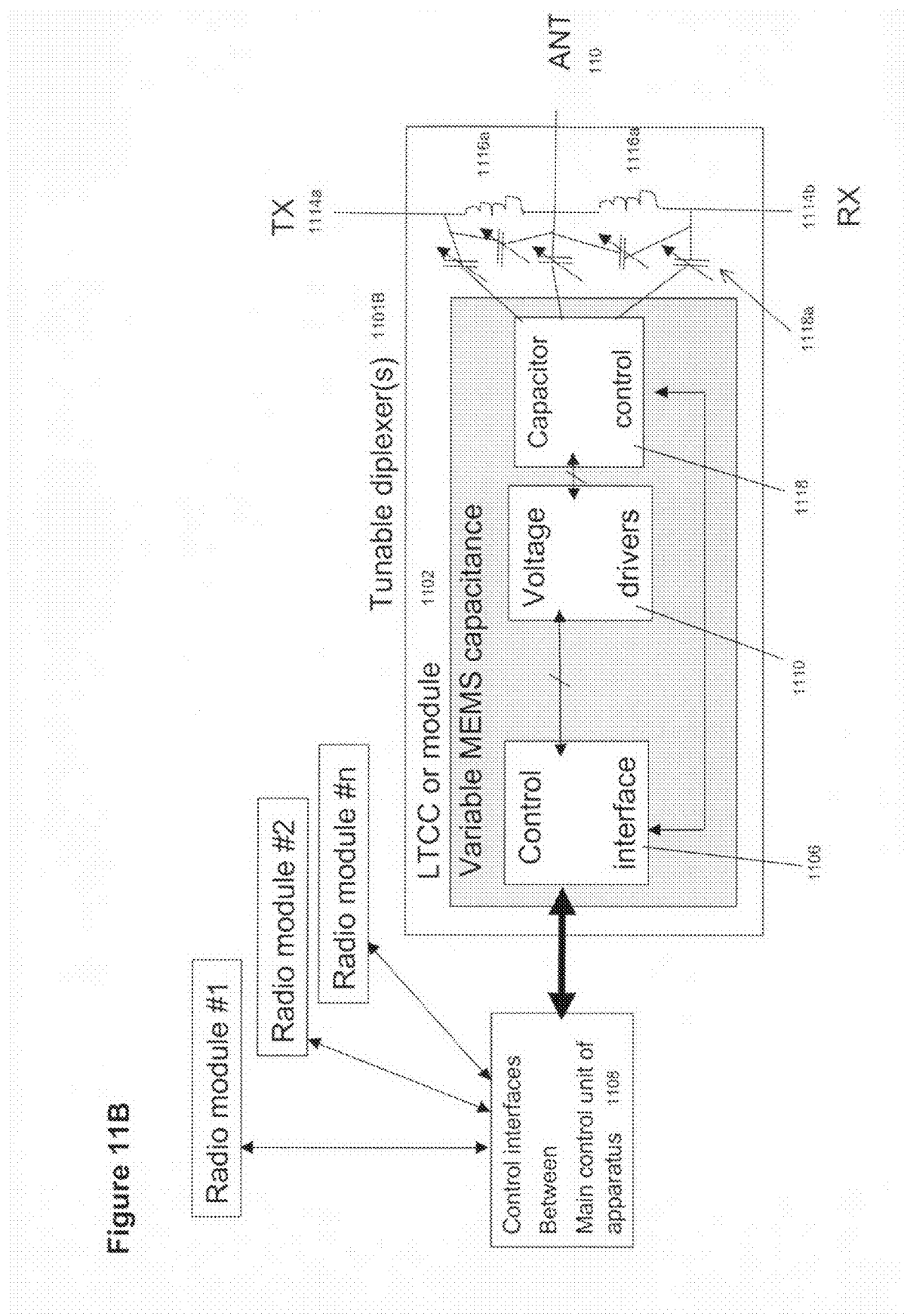
Figure 11C:
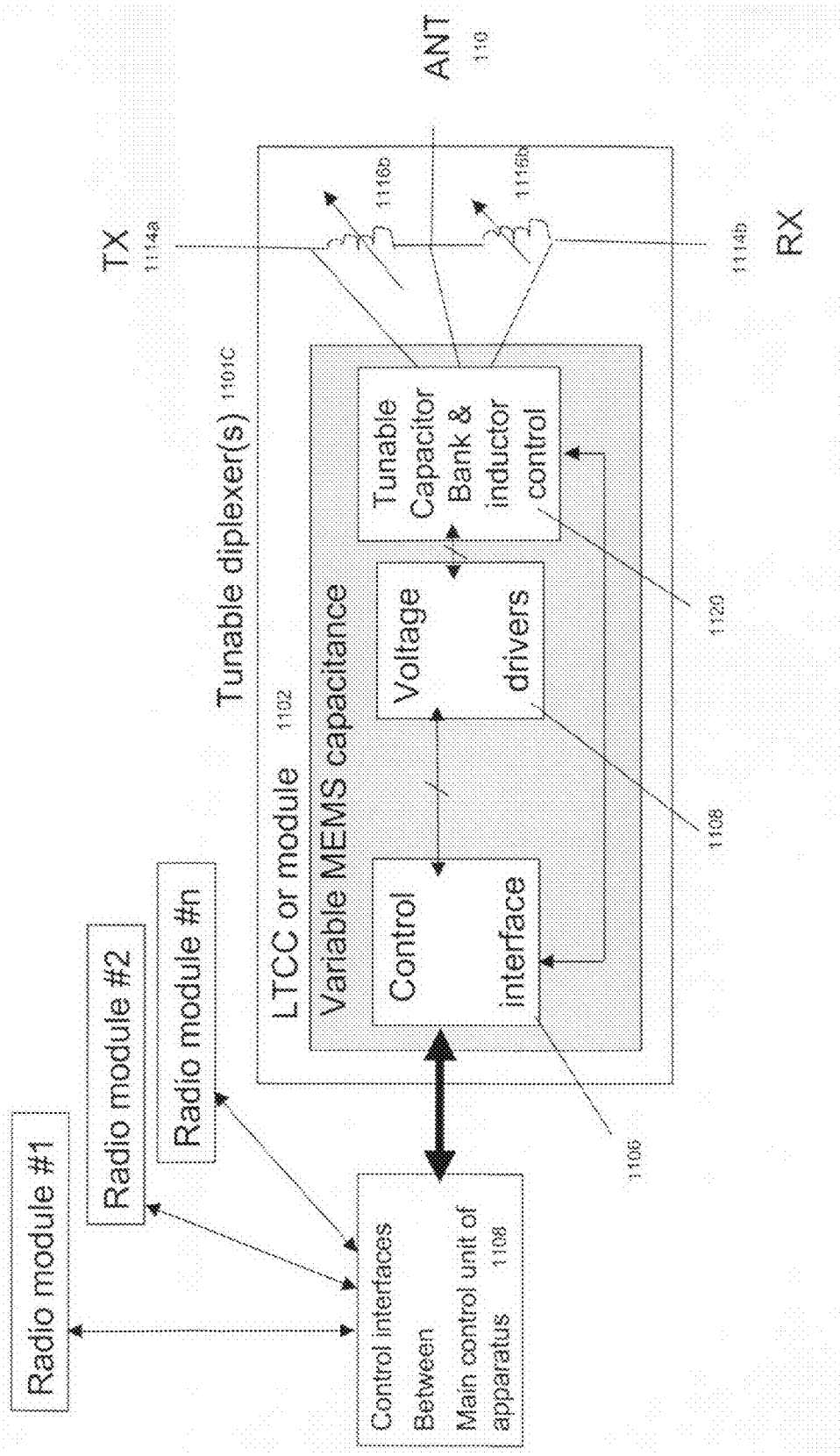

FIGS. 11A-C illustrate three different micro electromechanical systems (MEMS) based implementations of the frequency tunable diplexer that can be used throughout the various path selection circuitries/RF front end chipsets detailed above. The radio modules are analogous to the radios in FIGS. 2 through 8, and the control interfaces are to the processor/controller described with reference to those figures with the TX and RX signal ports going to the various transmitters and receivers of those radio modules. Given the position of the antenna 110 the tunable diplexer 1101A-C of FIGS. 11A-C is in the position of the tunable diplexer 121 of FIGS. 2-8 but these implementations could be disposed at any single or combination of the tunable diplexers shown in those other figures. The tunable diplexer 1101A-C is disposed on a substrate 1102 such as a low temperature co-fired ceramic LTCC and functions as a variable MEMS capacitance 1104 having a control interface 1106 between the processor 1108 and voltage drivers 1110 and in FIG. 11A also a tunable capacitor bank 1112 which selects between the antenna 110 and the frequency tunable signal ports 1114*a*, 1114*b*. Those three ports are isolated from one another by in-line inductances 1116*a*. The tunable capacitor bank can be implanted as parallel and/or shunt capacitors which may selectively be connected or avoided for any given radio use case, and/or variable capacitors whose capacitance value is changed via control signals from the processor via the control interface 1106 based on the use case.

At FIG. 11B is another MEMS implementation of the tunable diplexer 1101B wherein the capacitor bank is replaced by a capacitor control 1118 which controls capacitance at a set of variable capacitors 1118*a*. At FIG. 11C is yet another MEMS implementation of the tunable diplexer 1101C wherein the tunable capacitor bank of FIG. 11A is replaced by a tunable capacitor bank and inductor control 1120 which controls the inductance level of variable inductors 1116*b* that selectively isolate the signal ports 1114*a*, 114*b* and the antenna port to the antenna 110 on a frequency basis from one another based on the use case.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various exemplary aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. Although described in the context of particular and exemplary embodiments, it will be apparent to those skilled in the art that a number of modifications and various changes to these teachings may occur. Thus, while the invention has been particularly shown and described with respect to one or more exemplary embodiments thereof, it will be understood by those skilled in the art that certain modifications or changes may be made therein without departing from the scope of the invention as set forth above by example, or from the scope of the ensuing claims.

We claim:

1. An apparatus comprising:
   a tunable diplexer comprising a dedicated port, at least a first signal port and a second signal port, and control inputs configured to change at least one of frequency characteristics and phase characteristics of the tunable diplexer;
   a first radio node, a second radio node and a third radio node; and
   path selection circuitry configurable to select between a first signal pathway between the third radio node and the first signal port and a second signal pathway between the third radio node and the second signal port.

2. The apparatus of claim 1, further comprising a controller configured to send control signals to the control inputs so as to select between the first signal pathway and the second signal pathway based on an expected interference scenario between radio signals at the first signal port and the second signal port.

3. The apparatus of claim 2, further comprising a first radio coupled to the first radio node, a second radio coupled to the second radio node, and a third radio coupled to the third radio node, wherein the control signals select between the first signal pathway and the second signal pathway based on frequency characteristics of at least the first radio or the second radio.

4. The apparatus of claim 2, wherein the control inputs are configured to change the at least one frequency characteristics and phase characteristics at least one of the signal ports based on at least one of the following operational conditions of the apparatus: an operational frequency of a transmission or reception of a first radio coupled to the first radio node, an operational frequency of a transmission or reception of a second radio coupled to the second radio node, a power level of a received signal, a quality level of a received signal, a used modulation method, harmonic frequencies generated by radio blocks coupled to at least one of the radio nodes, harmonic power level generated from a radio block coupled to at least one of the radio nodes, wide band noise level at frequencies generated by radio blocks coupled to the radio nodes, timings of receptions and transmissions of a radio coupled to a radio node, a number of sub-carriers of a reception or transmission, operational temperature of the apparatus, ambient temperature of the apparatus, data rates of a signal passing through the diplexer, and expected interference signal level.

5. The apparatus of claim 2, wherein the control signals from the processor are based at least in part on at least one of: temperature information from a sensor of the apparatus, total radiated power performance, and total radiated sensitivity performance.

6. The apparatus of claim 1, wherein the dedicated port is configured to couple to a first antenna and the tunable diplexer further comprises a second dedicated port configured to couple to a second antenna.

7. The apparatus of claim 6, further comprising power detection circuitry adapted to adjust a power division ratio between the dedicated ports.

8. The apparatus of claim 1, wherein the path selection circuitry is configurable to select between a first configuration in which the first signal pathway is between the third radio node and the first signal port and a third signal pathway that is between the second radio node and the second signal port; and a second configuration in which the second signal pathway is between the third radio and the second signal port and a fourth signal pathway that is between the first radio node and the first signal port.

9. The apparatus of claim 1, further comprising a first radio, a second radio and a third radio respectively coupled to the first radio node, the second radio node and the third radio node such that any pair of the first, second and third radios may be simultaneously coupled along an active signal path to the respective first signal port and the second signal port, and further wherein a single antenna is coupled to the dedicated port.

10. The apparatus of claim 1, wherein the path selection circuitry comprises:
a first diplexer coupled to the first signal port and adapted to select between a first radio branch that goes between the third radio node and the first signal port and a second radio branch that goes between the third radio node and the second signal port.

11. The apparatus of claim 10, wherein the path selection circuitry further comprises:
a second diplexer along the first radio branch that selectively couples the first radio node to the first signal port based on control signals received at a control input of the second diplexer; and
a third diplexer along the second radio branch that selectively couples the second radio node to the second signal port based on control signals received at a control input of the third diplexer.

12. The apparatus of claim 1, further comprising an antenna port coupled to the dedicated port of the tunable diplexer.

13. The apparatus of claim 12, further comprising an additional antenna port coupled to at least one of the first, second or third radio nodes.

14. The apparatus of claim 1, further comprising a controller having control outputs coupled to the control inputs, the processor configured to power down unused radio blocks coupled to the path selection circuitry based on control signals sent over the control outputs.

15. The apparatus of claim 14, the apparatus comprising a portable multi-radio device.

16. The apparatus of claim 1 comprising an integrated circuit.

17. A method comprising:
determining an expected interference scenario between radios of a multiradio device;
based on the expected interference scenario, sending a control signal that changes at least one of frequency characteristics and phase characteristics of a tunable diplexer so as to couple a third radio of the radios to a first signal port of the tunable diplexer via a first signal pathway or to a second signal port of the tunable diplexer via a second signal pathway.

18. The method of claim 17, wherein the control signal is selected based at least on expected frequency interference of the third radio with one of a first radio or a second radio of the multi-radio device.

19. The method of claim 18, wherein the control signal is selected based at least in part on at least one of: temperature, total radiated power performance, and total radiated sensitivity performance.

20. The method of claim 19, for a first expected interference scenario the control signal selects a first circuit configuration in which the first signal pathway is active between the third radio and the first signal port and a third signal pathway is active between a second radio and the second signal port; and
for a second expected interference scenario the control signal selects a second circuit configuration in which the second signal pathway is active between the third radio and the second signal port and a fourth signal pathway is active between a first radio and the first signal port.

21. The method of claim 19, wherein the control signal operates to change at least one of the frequency characteristics and the phase characteristics of the tunable diplexer such that any pair of a first, second and third radios may be simultaneously coupled along an active signal path to the respective first signal port and the second signal port.

22. The method of claim 21, further wherein additional control signals dependent upon the expected interference scenario are selected and sent to additional diplexers so as to select at least any pair of radios from among a plurality of five radios to couple to the first and second signal ports.

23. The method of claim 22, further comprising powering down unused radios based on the control signals.

24. A computer readable memory tangibly storing a program of computer instructions that when executed by a digital processor result in actions directed to selecting a signal pathway for radios of a multi-radio device, the actions comprising:
determining an expected interference scenario between radios of a multiradio device;
based on the expected interference scenario, sending a control signal that changes at least one of frequency characteristics and phase characteristics of a tunable diplexer so as to couple a third radio of the radios to a first signal port of the tunable diplexer via a first signal pathway or to a second signal port of the tunable diplexer via a second signal pathway.

25. A device comprising:
adjustable switching means for changing at least one of frequency characteristics and phase characteristics of the adjustable switching means, the adjustable switching means comprising at least a dedicated port and a first signal port and a second signal port and control input means;
a first radio node, a second radio node and a third radio node; and
path selection means for selectively activating a first signal pathway between the third radio node and the first signal port and a second signal pathway between the third radio node and the second signal port.

* * * * *